US008750134B2

(12) United States Patent
Kamiya

(10) Patent No.: US 8,750,134 B2
(45) Date of Patent: Jun. 10, 2014

(54) COMMUNICATION NETWORK MANAGEMENT SYSTEM AND METHOD AND MANAGEMENT COMPUTER

(75) Inventor: Satoshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 89 days.

(21) Appl. No.: 13/218,250

(22) Filed: Aug. 25, 2011

(65) Prior Publication Data

US 2011/0310746 A1 Dec. 22, 2011

Related U.S. Application Data

(63) Continuation of application No. PCT/JP2010/052689, filed on Feb. 23, 2010.

(30) Foreign Application Priority Data

Feb. 25, 2009 (JP) ................................. 2009-043112

(51) Int. Cl.
 *H04J 3/14* (2006.01)
(52) U.S. Cl.
 USPC ........... 370/242; 370/241; 370/243; 370/244; 370/245; 370/246; 370/247; 370/248; 370/250; 370/251; 709/223; 709/224
(58) Field of Classification Search
 None
 See application file for complete search history.

(56) References Cited

U.S. PATENT DOCUMENTS 5,931,916 A * 8/1999 Barker et al. ................. 709/239

6,611,892 B1 8/2003 Sasaki et al.
6,859,895 B2 2/2005 Kitamura
(Continued)

FOREIGN PATENT DOCUMENTS

| JP | 63-155836 A | 6/1988 |
|----|-------------|--------|
| JP | 1-217666 A | 8/1989 |

(Continued)

OTHER PUBLICATIONS

Nick McKeown et al., "Open Flow: Enabling Innovation in Campus Networks", ACM SIGCOMM Computer Communication Review, vol. 38, No. 2, 2008 (http: //www.openflowswitch.org//documents/openflow-wp-latest.pdf), Mar. 14, 2008.

(Continued)

*Primary Examiner* — Hassan Phillips
*Assistant Examiner* — Gautam Sharma
(74) *Attorney, Agent, or Firm* — McGinn IP Law Grou, PLLC

(57) ABSTRACT

A management computer has: a storage unit in which a route information indicating a transfer route of frames in the communication network is stored; and a monitoring unit. The monitoring unit refers to the route information to transmit a frame to the transfer route and performs identification processing that identifies a location of a failure on the transfer route. First to N-th nodes (N is an integer equal to or more than 3) line up in order along the transfer route. The i-th node (i=1 to N−1) forwards a received frame to the (i+1)-th node, and the N-th node forwards a received frame to the management computer. In the identification processing, the monitoring unit sets at least one node between the first node and the N-th node as an insertion node. Then, the monitoring unit transmits a frame to the insertion node each, and identifies the location of the failure based on reception state of a frame from the N-th node.

14 Claims, 25 Drawing Sheets

(56) References Cited

U.S. PATENT DOCUMENTS

| | | |
|---|---|---|
| 7,373,563 B2 | 5/2008 | Noy et al. |
| 7,539,775 B2 | 5/2009 | Rikitake et al. |
| 7,782,764 B2 | 8/2010 | Zi |
| 7,813,303 B2 | 10/2010 | Yasuie et al. |
| 2002/0095627 A1* | 7/2002 | Kitamura ........................ 714/51 |
| 2003/0043792 A1* | 3/2003 | Carpini et al. ................ 370/386 |
| 2006/0215544 A1* | 9/2006 | Asa et al. ...................... 370/216 |
| 2006/0215548 A1 | 9/2006 | Le Faucheur et al. |
| 2007/0014232 A1 | 1/2007 | Yasuie et al. |
| 2007/0127367 A1 | 6/2007 | Ogasahara et al. |
| 2010/0110881 A1 | 5/2010 | Ryoo et al. |

FOREIGN PATENT DOCUMENTS

| | | | |
|---|---|---|---|
| JP | 3-191464 A | | 8/1991 |
| JP | 3-204255 A | | 9/1991 |
| JP | 8-8909 A | | 1/1996 |
| JP | 8-286920 A | | 11/1996 |
| JP | 9-83556 A | | 3/1997 |
| JP | 9-97269 A | | 4/1997 |
| JP | 9-247160 A | | 9/1997 |
| JP | 11-212959 A | | 8/1999 |
| JP | 2000-48003 A | | 2/2000 |
| JP | 2001-86120 A | | 3/2001 |
| JP | 2005-244405 A | | 9/2005 |
| JP | 3740982 B2 | | 2/2006 |
| JP | 2006-332787 A | | 12/2006 |
| WO | WO 2005/048540 A1 | | 5/2005 |

OTHER PUBLICATIONS

International Search Report (ISR) (PCT Form PCT/ISA/210) dated Mar. 23, 2010, with English translation.

S. Shah and M. Yip, "Extreme Networks' Ethernet Automatic Protection Switching (EAPS) Version 1", The Internet Society, Oct. 2003; (http://tools.ietf.org/html/rfc3619).

Office Action dated Oct. 17, 2013 in U.S. Appl. No. 13/137,814.

Office Action dated Feb. 28, 2013 in U.S. Appl. No. 13/137,814.

International Search Report dated Jul. 13, 2010 in PCT/JP2010/059625.

International Preliminary Report on Patentability dated Jan. 17, 2012 in PCT/JP2010/059625.

International Preliminary Report on Patentability dated Sep. 13, 2011 in PCT/JP2010/052689.

Japanese Office Action dated Oct. 21, 2013 with partial English translation thereof.

Japanese Office Action dated Aug. 5, 2013 with partial English translation thereof.

* cited by examiner

Fig. 5

TPL: TOPOLOGY TABLE

| SOURCE SWITCH | SOURCE PORT | DESTINATION SWITCH | DESTINATION PORT | STATUS |
|---|---|---|---|---|
| 2 | 27 | 4 | 47 | 1 |
| 2 | 28 | 5 | 58 | 1 |
| 2 | 29 | 3 | 37 | 1 |
| 3 | 37 | 2 | 29 | 1 |
| 3 | 39 | 5 | 59 | 1 |
| 4 | 47 | 2 | 27 | 1 |
| 4 | 49 | 5 | 57 | 1 |
| 5 | 57 | 4 | 49 | 1 |
| 5 | 58 | 2 | 28 | 1 |
| 5 | 59 | 3 | 39 | 1 |

Fig. 7

RTE: ROUTE TABLE

| Route ID | SEQUENCE | STOPOVER SWITCH | OUTPUT PORT |
|---|---|---|---|
| 00 | 1 | 2 | 27 |
| 00 | 2 | 4 | 49 |
| 00 | 3 | 5 | 58 |
| 00 | 4 | 2 | 29 |
| 00 | 5 | 3 | 39 |
| 00 | 6 | 5 | HOST |

Fig. 8

FR: CHECK FRAME

| MAC DA | MAC SA | Route ID | SEQUENCE NUMBER OF START-POINT |
|---|---|---|---|
| 00-00-4c-00-aa-00 | 00-00-4c-00-12-34 | 00 | A |

Fig. 9

22: FORWARDING TABLE

| INPUT PORT | MAC DA | MAC SA | OUTPUT PORT |
|---|---|---|---|
| HOST | 00-00-4c-00-aa-00 | 00-00-4c-00-12-34 | 27 |
| 28 | 00-00-4c-00-aa-00 | 00-00-4c-00-12-34 | 29 |

Fig. 10

32: FORWARDING TABLE

| INPUT PORT | MAC DA | MAC SA | OUTPUT PORT |
|---|---|---|---|
| 37 | 00-00-4c-00-aa-00 | 00-00-4c-00-12-34 | 39 |

Fig. 11

42: FORWARDING TABLE

| INPUT PORT | MAC DA | MAC SA | OUTPUT PORT |
|---|---|---|---|
| 47 | 00-00-4c-00-aa-00 | 00-00-4c-00-12-34 | 49 |

Fig. 12

52: FORWARDING TABLE

| INPUT PORT | MAC DA | MAC SA | OUTPUT PORT |
|---|---|---|---|
| 57 | 00-00-4c-00-aa-00 | 00-00-4c-00-12-34 | 58 |
| 59 | 00-00-4c-00-aa-00 | 00-00-4c-00-12-34 | HOST |

Fig. 16

INS: INSERTION SWITCH TABLE

| SEQUENCE NUMBER OF INSERTION SWITCH |
|---|
| i |

Fig. 21

INS: INSERTION SWITCH TABLE

| SEARCH RANGE | | SEQUENCE NUMBER OF INSERTION SWITCH |
|---|---|---|
| START-POINT | END-POINT | |
| s | e | m |

Fig. 24

INS: INSERTION SWITCH TABLE

| SEARCH RANGE | | SEQUENCE NUMBER OF INSERTION SWITCH |
|---|---|---|
| START-POINT | END-POINT | |
| s | e | m1 ··· mj ··· mn |

COMMUNICATION NETWORK MANAGEMENT SYSTEM AND METHOD AND MANAGEMENT COMPUTER

CROSS-REFERENCE TO RELATED APPLICATION

This is a continuation of International Application No. PCT/JP2010/052689, filed on Feb. 23, 2010.

TECHNICAL FIELD

The present invention relates to a communication network management technique that performs centralized management of a communication network by using a management computer.

BACKGROUND ART

In recent years, a communication network has a significant role as a social infrastructure that provides various services, and failure of the communication network has an incalculable impact on users. Therefore, health-checking of the communication network has become a very important issue.

Patent Literature 1 (International Publication WO2005/048540) discloses a technique that uses a keep-alive frame to detect a failure in a communication network. More specifically, in a communication system in which a plurality of base nodes perform communication through one or more relay node, each base node transmits a keep-alive frame that is broadcasted by the relay node. Here, the plurality of base nodes mutually transmit and receive the keep-alive frame and detect failure by monitoring arrival state of the keep-alive frame transmitted from the other side node. In this case, in order to health-check all physical links in the communication network, it is necessary to configure a plurality of communication routes so as to cover all the physical links and to transmit and receive the keep-alive frame with respect to each communication route. That is, it is required to transmit and receive a large number of keep-alive frames. This causes increase in transmission and reception burden placed on each base node.

Non-Patent Literature 1 (S. Shah and M. Yip, "Extreme Networks' Ethernet Automatic Protection Switching (EAPS) Version 1", The Internet Society, October 2003; (http://tools.ietf.org/html/rfc3619)) discloses a health-check technique in a communication network that is configured in a ring shape. In this case, a plurality of switches are connected through communication lines to form a ring shape, and one health-check frame is transferred sequentially along the ring. For example, a master switch on the ring transmits the health-check frame from a first port. Another switch forwards the received health-check frame to the next switch. The master switch receives the self-transmitted health-check frame at a second port, and thereby can confirm that no failure occurs. This technique assumes such a ring-shaped network structure and thus is not versatile.

Patent Literature 2 (Japanese Patent No. 3740982) discloses a technique that a management host computer performs health-check of a plurality of host computers. First, the management host computer determines an order of the health-check for the plurality of host computers. Next, the management host computer generates a health-check packet into which a health-check table is incorporated. The health-check table has a plurality of entries respectively related to the plurality of host computers, and the plurality of entries are arranged in the above determined order. Each entry includes an address of the related host computer and a check flag. Then, the management host computer transmits the health-check packet to a first host computer. A host computer that receives the health-check packet searches for the related entry in the health-check table and marks the check flag of the corresponding entry. After that, the host computer refers to the address in the next entry and transmits the health-check packet to the next host computer. Due to repetition of the above-mentioned processing, one health-check packet travels the host computers. Eventually, the management host computer receives the health-check packet that has traveled in this manner. Then, the management host computer determines that a failure occurs in a host computer the corresponding check flag of which is not marked.

According to Patent Literature 3 (Japanese Patent Publication JP-2006-332787), one health-check packet travels a plurality of monitor-target terminals, as in the case of Patent Literature 2. A similar health-check table is incorporated into the health-check packet. However, each entry includes, instead of the above-mentioned check flag, a check list in which such information as a date and time and an operating status is to be written. A monitoring terminal transmits the health-check packet to a first monitor-target terminal. When receiving the health-check packet, the monitor-target terminal judges whether or not itself is operating normally. In a case of a normal operation, the monitor-target terminal searches for the related entry in the health-check table and writes designated information such as the date and time and the operating status in the check list of the corresponding entry. Then, the monitor-target terminal refers to the address in the next entry and transmits the health-check packet to the next monitor-target terminal. Here, if communication with the next monitor-target terminal is impossible, the monitor-target terminal transmits the health-check packet to the monitor-target terminal after the next monitor-target terminal. Due to repetition of the above-mentioned processing, one health-check packet travels the monitor-target terminals. Eventually, the monitoring terminal receives the health-check packet that has traveled in this manner. If the designated information is not written in any check list, the monitoring terminal determines that a failure occurs.

It should be noted that Patent Literature 4 (Japanese Patent Publication JP-2000-48003), Patent Literature 5 (Japanese Patent Publication JP-H8-286920), Patent Literature 6 (Japanese Patent Publication JP-H11-212959) and Patent Literature 7 (Japanese Patent Publication JP-H3-191464) describe a method for solving a traveling salesman problem.

CITATION LIST

Patent Literature

[Patent Literature 1] International Publication WO2005/048540
[Patent Literature 2] Japanese Patent No. 3740982
[Patent Literature 3] Japanese Patent Publication JP-2006-332787
[Patent Literature 4] Japanese Patent Publication JP-2000-48003
[Patent Literature 5] Japanese Patent Publication JP-H8-286920
[Patent Literature 6] Japanese Patent Publication JP-H11-212959
[Patent Literature 7] Japanese Patent Publication JP-H3-191464

Non-Patent Literature

[Non-Patent Literature 1] S. Shah and M. Yip, "Extreme Networks Ethernet Automatic Protection Switching (EAPS) Version 1", The Internet Society, October 2003; (http://tools.ietf.org/html/rfc3619).

SUMMARY OF INVENTION

According to Patent Literature 3 described above, one health-check packet into which the health-check table is incorporated travels a plurality of nodes. When receiving the health-check packet, each node searches for the related entry in the health-check table and writes predetermined information such as the operating status in the corresponding entry. The predetermined information written in the health-check packet is used by the monitoring terminal for identifying location of failure. That is, the monitoring terminal performs identification of location of failure based on the predetermined information written in the health-check packet that comes back after traveling the plurality of nodes.

However, if communication between a node and the next node is not available, the traveling of the health-check packet is not achieved and thus the monitoring terminal cannot receive the health-check packet. That is, the monitoring terminal cannot perform the processing of identifying the location of failure. Therefore, a node that receives the health-check packet investigates whether or not it can communicate with the next node, before forwarding the health-check packet to the next node. More specifically, the node tries to connect a line with the next node for establishing handshake. If communication with the next node is impossible, the node searches for an available communication partner such as a node after the next node. Then, the node transmits the health-check packet to the available communication partner such as the node after the next node. However, such the processing is complicated and places overmuch burden on each node.

An object of the present invention is to provide a technique that can reduce burden placed on each node, when performing centralized management of a communication network including a plurality of nodes by using a management computer.

In an aspect of the present invention, a communication network management system is provided. The communication network management system has: a communication network; and a management computer configured to manage the communication network. The communication network includes a plurality of nodes and a plurality of links connecting between the plurality of nodes. The management computer has: a storage unit in which a route information indicating a transfer route of frames in the communication network is stored; and a monitoring unit. The monitoring unit refers to the route information to transmit a frame to the transfer route and performs identification processing that identifies a location of a failure on the transfer route. First to N-th nodes (N is an integer equal to or more than 3) line up in order along the transfer route. The i-th node (i=1 to N−1) forwards a received frame to the (i+1)-th node, and the N-th node forwards a received frame to the management computer. In the identification processing, the monitoring unit sets at least one node between the first node and the N-th node as an insertion node. Then, the monitoring unit transmits a frame to the insertion node each, and identifies the location of the failure based on reception state of a frame from the N-th node.

In another aspect of the present invention, a management computer that manages a communication network is provided. The communication network includes a plurality of nodes and a plurality of links connecting between the plurality of nodes. The management computer has: a storage unit in which a route information indicating a transfer route of frames in the communication network is stored; and a monitoring unit. The monitoring unit refers to the route information to transmit a frame to the transfer route and performs identification processing that identifies a location of a failure on the transfer route. First to N-th nodes (N is an integer equal to or more than 3) line up in order along the transfer route. The i-th node (i=1 to N−1) forwards a received frame to the (i+1)-th node, and the N-th node forwards a received frame to the management computer. In the identification processing, the monitoring unit sets at least one node between the first node and the N-th node as an insertion node. Then, the monitoring unit transmits a frame to the insertion node each, and identifies the location of the failure based on reception state of a frame from the N-th node.

In still another aspect of the present invention, a communication network management method that manages a communication network by using a management computer is provided. The communication network includes a plurality of nodes and a plurality of links connecting between the plurality of nodes. The communication network management method includes: transmitting a frame from the management computer to a transfer route of frames in the communication network. Here, first to N-th nodes (N is an integer equal to or more than 3) line up in order along the transfer route. The i-th node (i=1 to N−1) forwards a received frame to the (i+1)-th node, and the N-th node forwards a received frame to the management computer. The communication network management method further includes: identifying, by the management computer, a location of a failure on the transfer route. The identifying includes: setting at least one node between the first node and the N-th node as an insertion node; transmitting a frame to the insertion node each; and identifying the location of the failure based on reception state of a frame from the N-th node.

In still another aspect of the present invention, a management program recorded on a tangible computer-readable medium that, when executed, causes a management computer to perform management processing of a communication network is provided. The communication network includes a plurality of nodes and a plurality of links connecting between the plurality of nodes. The management processing includes: storing a route information indicating a transfer route of frames in the communication network in a storage device; and transmitting a frame to the transfer route by referring to the route information. Here, first to N-th nodes (N is an integer equal to or more than 3) line up in order along the transfer route. The i-th node (i=1 to N−1) forwards a received frame to the (i+1)-th node, and the N-th node forwards a received frame to the management computer. The management processing further includes: identifying a location of a failure on the transfer route. The identifying includes: setting at least one node between the first node and the N-th node as an insertion node; transmitting a frame to the insertion node each; and identifying the location of the failure based on reception state of a frame from the N-th node.

According to the present invention, it is possible to reduce burden placed on each node, when performing centralized management of a communication network including a plurality of nodes by using a management computer.

BRIEF DESCRIPTION OF DRAWINGS

The above and other objects, advantages and features of the present invention will be more apparent from the following description of certain exemplary embodiments taken in conjunction with the accompanying drawings.

FIG. 5 shows an example of a topology table.

FIG. 7 shows an example of a route table.

FIG. 8 is a conceptual diagram showing an example of a check frame.

FIG. 9 shows a forwarding table of a switch 2.

FIG. 10 shows a forwarding table of a switch 3.

FIG. 11 shows a forwarding table of a switch 4.

FIG. 12 shows a forwarding table of a switch 5.

FIG. 16 shows an insertion switch table used in the first example.

FIG. 21 shows an insertion switch table used in the third example.

FIG. 24 shows an insertion switch table used in the fourth example.

DESCRIPTION OF EMBODIMENTS

1. Summary

Figure 1:
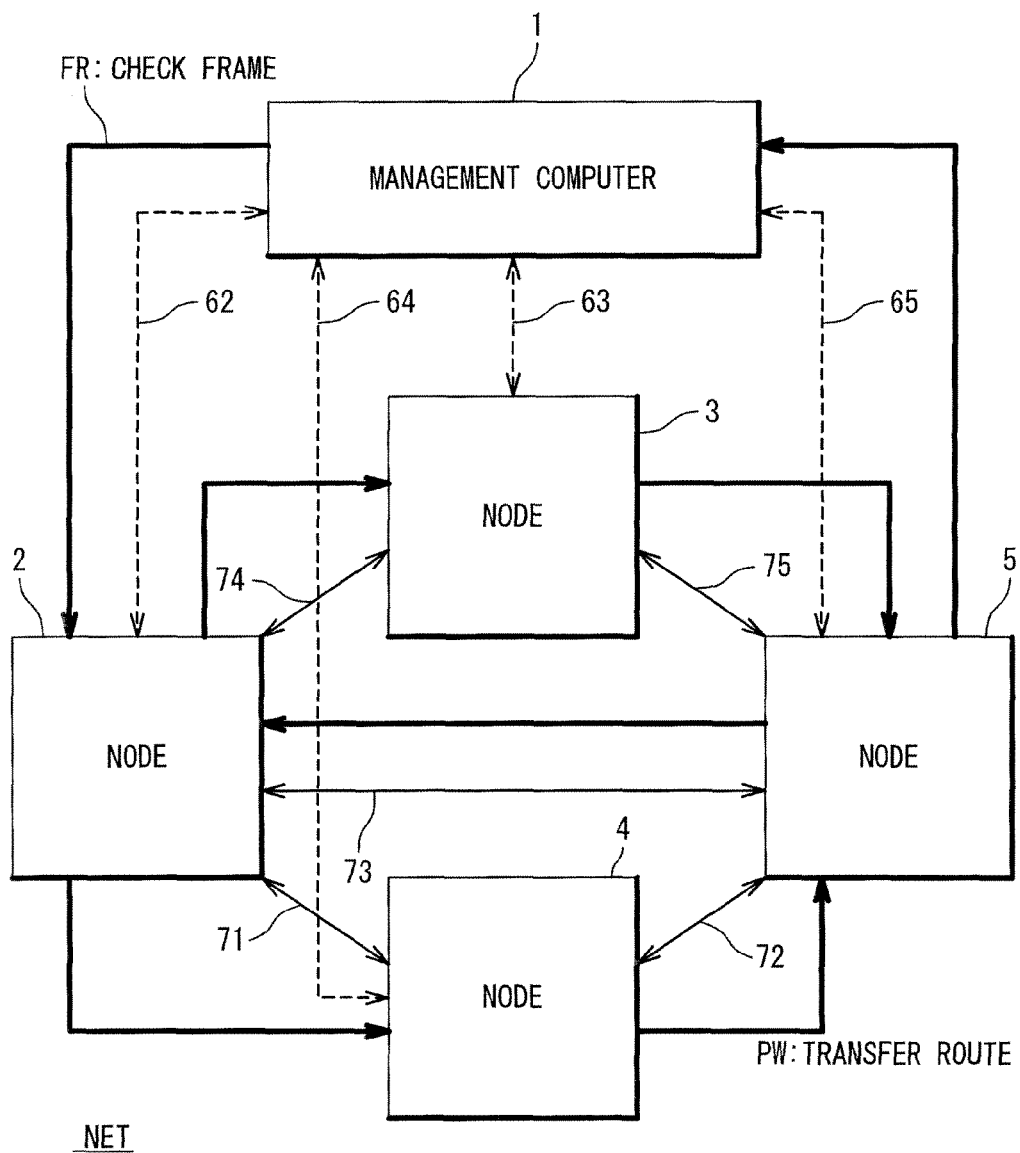
FIG. 1 is a block diagram showing a configuration example of a communication network management system according to an exemplary embodiment of the present invention.

FIG. 1 schematically shows a configuration example of a communication network management system 100 according to an exemplary embodiment of the present invention. In the communication network management system 100, centralized management of a communication network is performed by a management computer. That is, the communication network management system 100 is provided with a communication network NET and a management computer 1 that manages the communication network NET, as shown in FIG. 1.

The communication network NET includes a plurality of nodes 2 to 5 and a plurality of physical links 71 to 75 connecting between the nodes 2 to 5. The physical link 71 is a signal line that bi-directionally connects the node 2 and the node 4. The node 2 and the node 4 can communicate bi-directionally through the physical link 71. The physical link 72 is a signal line that bi-directionally connects the node 4 and the node 5. The node 4 and the node 5 can communicate bi-directionally through the physical link 72. The physical link 73 is a signal line that bi-directionally connects the node 5 and the node 2. The node 5 and the node 2 can communicate bi-directionally through the physical link 73. The physical link 74 is a signal line that bi-directionally connects the node 2 and the node 3. The node 2 and the node 3 can communicate bi-directionally through the physical link 74. The physical link 75 is a signal line that bi-directionally connects the node 3 and the node 5. The node 3 and the node 5 can communicate bi-directionally through the physical link 75.

A control link 62 is a signal line that bi-directionally connects the management computer 1 and the node 2. A control link 63 is a signal line that bi-directionally connects the management computer 1 and the node 3. A control link 64 is a signal line that bi-directionally connects the management computer 1 and the node 4. A control link 65 is a signal line that bi-directionally connects the management computer 1 and the node 5. The management computer 1 and the nodes 2 to 5 can communicate bi-directionally through the control links 62 to 65, respectively.

The management computer 1 transmits a frame for health-check (hereinafter referred to as a "check frame FR") to the communication network NET. The check frame FR goes through a certain transfer route PW in the communication network NET and comes back to the management computer 1. The transfer route PW of the check frame FR may be appropriately determined by the management computer 1 or may be fixed.

As an example, a transfer route PW along which the check frame FR travels in an order of "node 2-4-5-2-3-5" is shown in FIG. 1. In this case, the management computer 1 transmits the check frame FR to the node 2 through the control link 62. The node 2 forwards the received check frame FR to the subsequent node 4 through the physical link 71. The node 4 forwards the received check frame FR to the subsequent node 5 through the physical link 72. The node 5 forwards the received check frame FR to the subsequent node 2 through the physical link 73. The node 2 forwards the received check frame FR to the subsequent node 3 through the physical link 74. The node 3 forwards the received check frame FR to the subsequent node 5 through the physical link 75. In this manner, each node, when receiving the check frame FR, forwards the received check frame FR along the transfer route PW. Lastly, the node 5 forwards the received check frame FR to the management computer 1.

Figure 2:
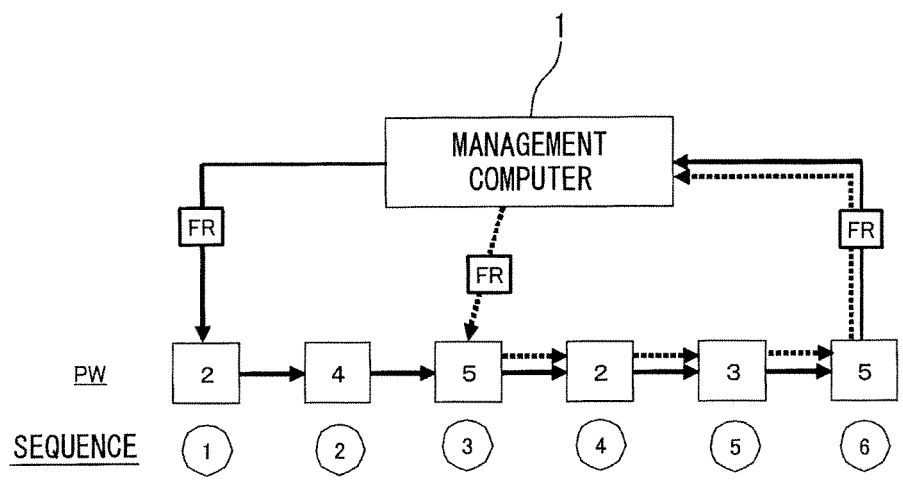
FIG. 2 shows processing in the communication network management system according to the present exemplary embodiment.

FIG. 2 shows in an easy-to-understand manner the travelling of the check frame FR shown in FIG. 1. N nodes line up in order on the transfer route PW of the check frame FR. The N is an integer equal to or more than 3. Hereinafter, the N nodes are respectively referred to as "first to N-th nodes" in an order along the transfer route PW. The first to N-th nodes may include a physically identical node for plural times. In the example shown in FIG. 2, N=6, the first node is the node 2, the second node is the node 4, the third node is the node 5, the fourth node is the node 2, the fifth node is the node 3, and the sixth node is the node 5.

At normal times, the management computer 1 transmits a check frame FR to the first node being a start-point of the transfer route PW. The i-th node (i=1 to N−1) on the transfer route PW, when receiving the check frame FR, forwards the received check frame FR to the (i+1)-th node. The N-th node, when receiving the check frame FR, forwards the received check frame FR to the management computer 1. In this manner, the travelling of the check frame FR is achieved.

Here, let us consider a case where a failure is occurring at some node on the transfer route PW. In this case, the management computer 1 carries out identification of location of the failure on the transfer route PW. More specifically, the management computer 1 transmits a check frame FR to at least one node in the middle of the transfer route PW. Such the node is hereinafter referred to as an "insertion node". That is, the management computer 1 sets at least one node between the first node and the N-th node on the transfer route PW as the "insertion node". Then, the management computer 1 transmits the check frame FR to each insertion node. As an example, FIG. 2 shows a case where the third node is selected as the insertion node.

After that, each node performs the processing of forwarding the check frame FR in a similar way. If the management computer 1 receives the check frame FR from the N-th node, it means that the check frame FR has been transferred from the insertion node to the N-th node without being lost. Therefore, the management computer 1 can judge that the links after the insertion node are healthy and there exists the failure in the transfer route PW before the insertion node. On the other hand, if the management computer 1 does not receive the check frame FR from the N-th node, it means that the check frame FR has not been transferred from the insertion node to the N-th node. Therefore, the management computer 1 can judge that there exists the failure in the transfer route PW after the insertion node. By appropriately change the insertion node and repeating the same processing, the management computer 1 can identify the location of failure on the transfer route PW. That is, the management computer 1, which transmits the check frame FR to the insertion node, can identify the location of failure based on reception state of the check frame FR from the N-th node.

According to the present exemplary embodiment, each node on the transfer route PW just needs to forward the received check frame FR also in the failure location identification processing, as in the case of normal times. There is no need to change the setting of each node for identifying the location of failure. Also, each node needs not to write health-check information and the like to the check frame FR. Furthermore the complicated processing such as required in Patent Literature 2 or Patent Literature 3 is not necessary for identifying the location of failure. For example, such processing as described in Patent Literature 3 that each node investigates whether or not it can communicate with the next node is not necessary. Consequently, burden placed on each node is greatly reduced. According to the present exemplary embodiment, it is possible to identify the location of failure on the transfer route PW with simple processing and to reduce burden placed on each node.

It should be noted that although the term "frame" is used in the above description, the same applies to a case of "packet (IP packet etc.)".

The present invention can be applied to health-check of nodes and physical links on a LAN of companies, data centers, universities and the like and health-check of communication equipments and physical links of telecommunication carriers.

2. Concrete Example

Hereinafter, an exemplary embodiment of the present invention will be described in more detail. Various methods are possible as a method for achieving the traveling of the check frame FR along a predetermined transfer route PW in the communication network NET. In the following description, for example, each node is provided with a "forwarding table" in order to achieve the traveling of the check frame FR. The forwarding table is a table that indicates a correspondence relationship between input sources and forwarding destinations of the check frames FR. Each node can forward the check frame FR received from an input source to a designated forwarding destination, by referring to the forwarding table.

Contents of the forwarding table of each node are set up by each node in accordance with an instruction from the management computer 1. More specifically, the management computer 1 uses the control link (62, 63, 64, 65) to instruct each node (2, 3, 4, 5) to set up the forwarding table. Here, the management computer 1 instructs each node to set up the forwarding table such that the check frames FR are forwarded along the transfer route PW. Each node sets up the contents of the forwarding table in accordance with the instruction from the management computer 1.

Various interfaces are possible as an interface between the management computer and the nodes for achieving the processing described above. For example, Openflow (refer to http://www.openflowswitch.org/) is applicable. In this case, an "Openflow Controller" serves as the management computer 1 and an "Openflow Switch" serves as each of the nodes 2 to 5. It is possible to set up the forwarding table by using "Secure Channel" of the Openflow. Alternatively, GMPLS (Generalized Multi-Protocol Label Switching) also is applicable. In this case, the management computer instructs a GMPLS switch to set up the forwarding table. Alternatively, VLAN (Virtual LAN) also is applicable. In this case, the management computer can control VLAN setting of each switch by using an MIB (Management Information Base) interface.

In the following description, let us consider a case where the Openflow is used as the interface between the management computer and the nodes.

Figure 3:
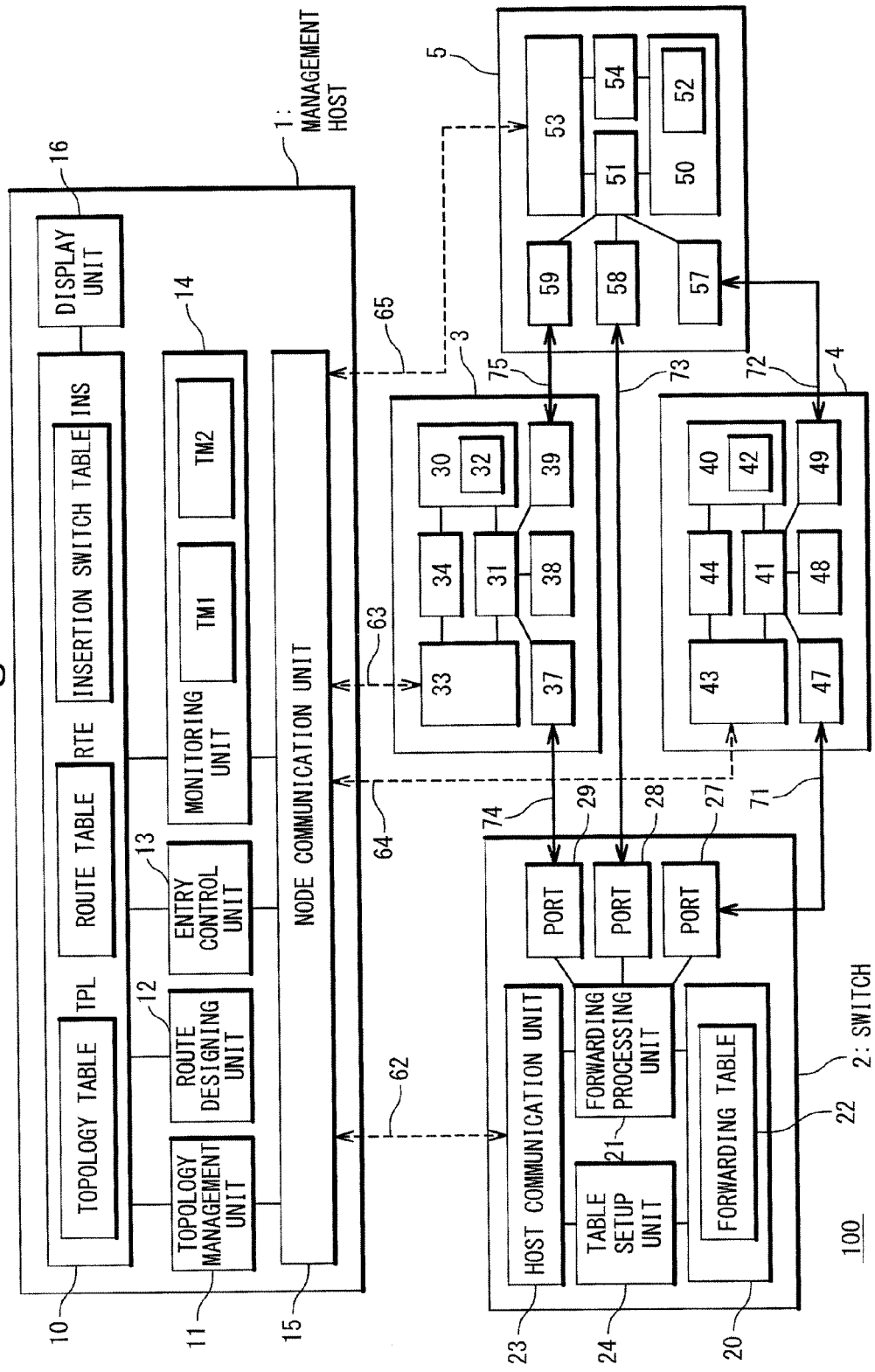
FIG. 3 is a block diagram showing a configuration example of the communication network management system according to the present exemplary embodiment.

FIG. 3 is a block diagram showing a configuration example of the communication network management system 100 according to the present exemplary embodiment. A management host 1 (Openflow Controller) in FIG. 3 is equivalent to the management computer 1 in FIG. 1. Switches 2 to 5 (Openflow Switch) in FIG. 3 are equivalent to the nodes 2 to 5 in FIG. 1, respectively.

The management host 1 has a storage unit 10, a topology management unit 11, a route designing unit 12, an entry control unit 13, a monitoring unit 14, a node communication unit 15 and a display unit 16. The node communication unit 15 is connected to the switches 2 to 5 through the control links 62 to 65, respectively. The management host 1 can communicate bi-directionally with the switches 2 to 5 by using the node communication unit 15 and the control links 62 to 65.

The storage unit 10 is a storage device such as a RAM and an HDD. A topology table TPL, a route table RTE, an insertion switch table INS and the like are stored in the storage unit 10. The topology table TPL (topology information) indicates the above-mentioned physical topology of the communication network NET, namely, a connection relationship between the switches 2 to 5. The route table RTE (route information) indicates the transfer route PW of the check frames FR in the communication network NET. The insertion switch table INS indicates information on an "insertion switch" to which the check frame FR is transmitted at failure location identification processing.

The topology management unit 11 creates the topology table TPL and stores it in the storage unit 10. Moreover, the topology management unit 11 receives from the node communication unit 15 a topology change notification that is transmitted from each switch. Here, the topology change notification is information indicating change in the physical topology of the communication network NET and includes new switch connection information, up-down notification of a physical link and so forth. The topology management unit 11 updates the topology table TPL in accordance with the received topology change notification.

The route designing unit 12 refers to the topology table TPL stored in the storage unit 10 to determine (design) the transfer route PW of the check frame FR in the communication network NET. Then, the route designing unit 12 stores the route table RTE indicating the determined transfer route PW in the storage unit 10.

The entry control unit 13 instructs each switch (2, 3, 4, 5) to set up the forwarding table (22, 32, 42, 52). More specifically, the entry control unit 13 refers to the topology table TPL and the route table RTE stored in the storage unit 10. Then, the entry control unit 13 instructs each switch (2, 3, 4, 5) to set up the forwarding table (22, 32, 42, 52) such that the check frames FR are forwarded along the transfer route PW indicated by the route table RTE. The entry control unit 13 transmits a table setup command indicating the instruction to each switch (2, 3, 4, 5) through the node communication unit 15 and the control links (62, 63, 64, 65).

The monitoring unit 14 performs, based on the route table RTE stored in the storage unit 10, transmission and reception of the check frames FR to and from the communication network NET. The transmission and reception of the check frame FR to and from the switch 2 is performed through the node communication unit 15 and the control link 62. The transmission and reception of the check frame FR to and from the switch 3 is performed through the node communication unit 15 and the control link 63. The transmission and reception of the check frame FR to and from the switch 4 is performed through the node communication unit 15 and the control link 64. The transmission and reception of the check frame FR to and from the switch 5 is performed through the node communication unit 15 and the control link 65. Moreover, as will be described later in detail, the monitoring unit 14 detects a failure occurrence in the transfer route PW and performs processing of identifying a location of the failure.

It should be noted that the topology management unit 11, the route designing unit 12, the entry control unit 13 and the monitoring unit 14 described above can be realized by a processor executing a computer program.

The display unit 16 is a display device such as a liquid crystal display device. The display unit 16 displays various information. For example, the display unit 16 displays the connection state between the switches indicated by the topology table TPL and a state of failure occurrence that will be described below.

The switch 2 has a table storage unit 20, a forwarding processing unit 21, a host communication unit 23, a table setup unit 24, a port 27, a port 28 and a port 29. The host communication unit 23 corresponds to the "Secure Channel" of the "Openflow Switch". The host communication unit 23 is connected to the management host 1 through the control link 62, and the switch 2 can communicate bi-directionally with the management host 1 by using the host communication unit 23 and the control link 62. Moreover, each port (communication interface) is connected to another switch through the physical link, and the switch 2 can communicate bi-directionally with another switch by using the port and the physical link.

The table storage unit 20 is a storage device such as a RAM and an HDD. The forwarding table 22 that indicates a correspondence relationship between input sources and forwarding destinations of the check frames FR is stored in the table storage unit 20.

The forwarding processing unit 21 receives the check frame FR from the host communication unit 23 (i.e. management host 1). Alternatively, the forwarding processing unit 21 receives the check frame FR from any port (i.e. another switch). Then, by referring to the forwarding table 22 stored in the table storage unit 20, the forwarding processing unit 2 forwards the check frame FR received from an input source to a forwarding destination (host communication unit 23 or port) designated by the forwarding table 22. In a case where a plurality of forwarding destinations are designated, the forwarding processing unit 21 copies the check frame FR and forwards them respectively to the plurality of forwarding destinations.

The table setup unit 24 receives from the host communication unit 23 the above-mentioned table setup command transmitted from the management host 1. Then, in accordance with the table setup command, the table setup unit 24 sets (add, delete, change) the contents of the forwarding table 22 stored in the table storage unit 20.

Other switches 3 to 5 each has a similar configuration to that of the switch 2. That is, the switch 3 has a table storage unit 30, a forwarding processing unit 31, a host communication unit 33, a table setup unit 34, a port 37, a port 38 and a port 39. A forwarding table 32 is stored in the table storage unit 30. The switch 4 has a table storage unit 40, a forwarding processing unit 41, a host communication unit 43, a table setup unit 44, a port 47, a port 48 and a port 49. A forwarding table 42 is stored in the table storage unit 40. The switch 5 has a table storage unit 50, a forwarding processing unit 51, a host communication unit 53, a table setup unit 54, a port 57, a port 58 and a port 59. A forwarding table 52 is stored in the table storage unit 50. Each component and processing are the same as in the case of the switch 2, and description thereof is omitted.

In the example shown in FIG. 3, the physical topology of the communication network NET, namely, the connection relationship between the switches 2 to 5 is as follows. The port 27 of the switch 2 and the port 47 of the switch 4 are connected bi-directionally through the physical link 71. The port 49 of the switch 4 and the port 57 of the switch 5 are connected bi-directionally through the physical link 72. The port 58 of the switch 5 and the port 28 of the switch 2 are connected bi-directionally through the physical link 73. The port 29 of the switch 2 and the port 37 of the switch 3 are connected bi-directionally through the physical link 74. The port 39 of the switch 3 and the port 59 of the switch 5 are connected bi-directionally through the physical link 75.

3. Detection of Failure Occurrence

Figure 4:
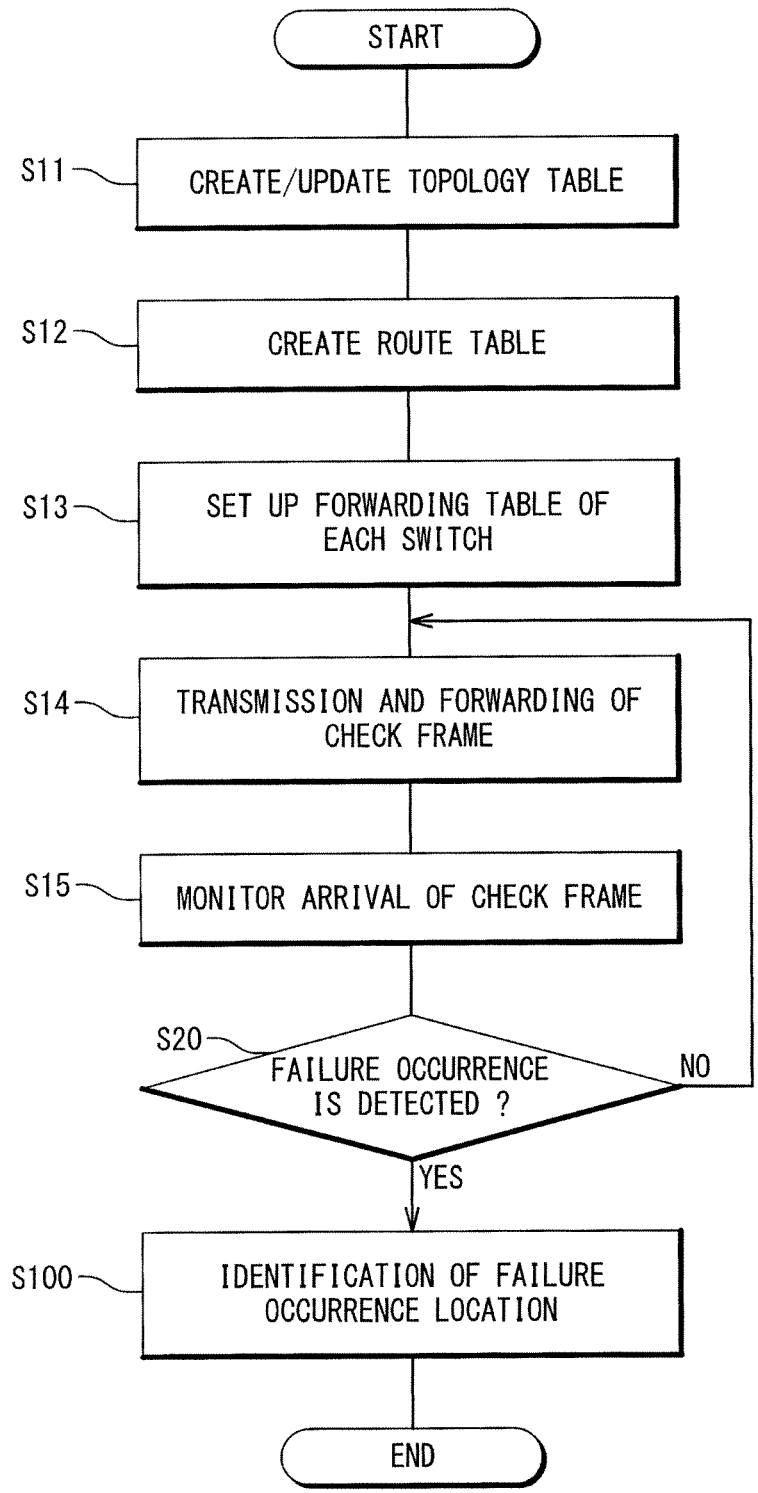
FIG. 4 is a flow chart showing a communication network management method according to the present exemplary embodiment.

FIG. 4 is a flow chart showing a communication network management method according to the present exemplary embodiment. The communication network management processing according to the present exemplary embodiment will be described in detail with reference to FIGS. 3 and 4 as appropriate. It should be noted that management processing by the management host 1 is realized by the management host 1 executing a management program. Also, frame forwarding processing by each switch is realized by the each switch executing a frame forwarding program.

Step S11:

The topology management unit 11 creates the topology table TPL and stores it in the storage unit 10. Moreover, the topology management unit 11 receives the topology change notification from each switch and updates the topology table TPL in accordance with the topology change notification.

Here, let us consider a case where the physical topology of the communication network NET is as shown in FIG. 3. FIG. 5 shows an example of the topology table TPL in that case. The topology table TPL has a plurality of entries that are respectively related to a plurality of physical links 71 to 75. In the case where the physical link is bi-directional, the entry is created with respect to each direction. Each entry indicates a source switch, a source port, a destination switch, a destination port and a status flag with regard to the related physical link. The source switch is a switch as a start-point of the physical link, and the source port is a port of the source switch. The destination switch is a switch as an end-point of the physical link, and the destination port is a port of the destination switch. For example, the first entry "source switch=2, source port=27, destination switch=4, destination port=47" in FIG. 5 is related to the physical link 71 from the switch 2 toward the switch 4. The same applies to the other entries.

The status flag included in each entry indicates whether the related physical link is available or not. If validity of a physical link is confirmed, the status flag of the entry related to the physical link is set to "1 (available)" On the other hand, if validity of a physical link is not yet confirmed or a failure is occurring at the physical link, the status flag of the entry related to the physical link is set to "0 (not available)". In the example shown in FIG. 5, the status flags of all the entries are "1".

Step S12:

The route designing unit 12 refers to the physical topology indicated by the above-mentioned topology table TPL to determine (design) the transfer route PW of the check frame FR. Then, the route designing unit 12 creates the route table RTE indicating the determined transfer route PW and stores it in the storage unit 10.

Here, the route designing unit 12 may determine the transfer route PW such that all of the physical links 71 to 75 is traversable by the transfer route PW. When determining the traversable route, an algorithm for solving the traveling salesman problem (for example, refer to Patent Literature 4, Patent Literature 5, Patent Literature 6 and Patent Literature 7) can be used. In this case, each physical link corresponds to a "destination to visit by a salesman in the traveling salesman problem".

Moreover, the transfer route PW may not be a complete traversable route. The transfer route PW may be determined such that the check frame FR travels as many physical links as possible. Alternatively, all the physical links 71 to 75 may be covered by combining a plurality of traversable routes. In this case, successive route IDs such as "00", "01", "02" are given to the respective traversable routes.

Figure 6:
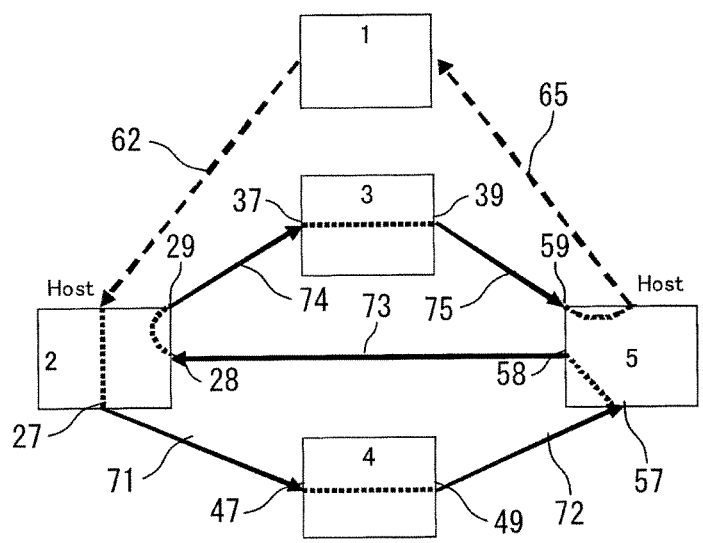
FIG. 6 shows an example of a transfer route of check frames.

FIG. 6 shows an example of the transfer route PW with which the physical links 71 to 75 are traversable. In the case of the transfer route PW shown in FIG. 6, the switch 2 (first switch), the physical link 71, the switch 4 (second switch), the physical link 72, the switch 5 (third switch), the physical link 73, the switch 2 (fourth switch), the physical link 74, the switch 3 (fifth switch), the physical link 75 and the switch 5 (sixth switch) are connected in this order. The check frame FR is transferred along this transfer route PW.

FIG. 7 shows an example of the route table RTE in the case of the transfer route PW shown in FIG. 6. The route table RTE has a plurality of entries that indicate in order the transfer route PW shown in FIG. 6. Each entry indicates the route ID, a sequence, a stopover switch and an output port. The route ID is an ID that is given with respect to each transfer route PW. The sequence indicates a sequence number of each switch. In the present example, there exist first to sixth switches in this order along the transfer route PW. The stopover switch indicates a switch associated with the sequence number. The output port is a port connected to the next sequence number switch and indicates an output destination of the check frame FR. If the output destination is the host communication unit (i.e. management host 1), the output port is expressed by "HOST".

FIG. 8 is a conceptual diagram showing an example of the check frame FR. The check frame FR has information on a destination MAC address (MAC DA), a source MAC address (MAC SA), the route ID and a sequence number A. In the present exemplary embodiment, the destination MAC address is used for distinguishing the check frame FR. The setting of the destination MAC address is arbitrary as long as the check frame FR can be distinguished. For example, the destination MAC address is set to "00-00-4c-00-aa-00". The source MAC address is set to a MAC address "00-00-4c-00-12-34" of the management host 1. The route ID is an ID that is given with respect to each transfer route PW, as described above. The sequence number A indicates the sequence number of a destination switch to which the check frame FR is transmitted from the management host 1. For example, in a case where a check frame FR is transmitted from the management host 1 to the first switch, the sequence number A of the check frame FR is set to "1" according to the route table RTE shown in FIG. 7.

Step S13:

The entry control unit 13 of the management host 1 instructs the table setup unit of each of the switches 2 to 5 to set up each forwarding table. At this time, the entry control unit 13 refers to the topology table TPL and the route table RTE stored in the storage unit 10. Then, the entry control unit 13 determines contents of the instruction such that the check frame FR is forwarded along the transfer route PW indicated by the route table RTE. The table setup command indicating the instruction is transmitted from the entry control unit 13 to each switch (2, 3, 4, 5) through the node communication unit 15 and the control link (62, 63, 64, 65).

In the switch 2, the table setup unit 24 receives the table setup command from the host communication unit 23. Then, the table setup unit 24 sets, in accordance with the table setup command, the contents of the forwarding table 22 stored in the table storage unit 20. FIG. 9 shows an example of the forwarding table 22 in the case of the transfer route PW shown in FIG. 6. The forwarding table 22 indicates an input port, the destination MAC address (MAC DA), the source MAC address (MAC SA) and an output port.

The input port indicates the input source (port or host communication unit 23) to which the check frame FR is input. If the input source is any port (i.e. another switch), the input port is expressed by its port number. If the input source is the host communication unit 23 (i.e. the management host 1), the input port is expressed by "HOST".

The output port indicates the forwarding destination (port or host communication unit 23) to which the check frame FR is forwarded. If the forwarding destination is any port (i.e. another switch), the output port is expressed by its port number. If the forwarding destination is the host communication unit 23 (i.e. management host 1), the output port is expressed by "HOST". It should be noted that a plurality of output ports may be set with respect to one entry. In this case, the check frame FR is output to the respective output ports.

The destination MAC address in the forwarding table 22 is the same as the above-mentioned destination MAC address in the check frame FR. In the present example, the destination MAC address is "00-00-4c-00-aa-00". Moreover, the source MAC address in the forwarding table 22 is the same as the above-mentioned source MAC address in the check frame FR. In the present example, the source MAC address is the MAC address "00-00-4c-00-12-34" of the management host 1. It should be noted that the source MAC address may be omitted if only one management host 1 is used.

As described above, the forwarding table 22 includes the input source (input port), the forwarding destination (output port) and header information (MAC DA, MAC SA and the like) regarding the check frame FR. In other words, the forwarding table 22 indicates a correspondence relationship between the input source, the header information and the forwarding destination with regard to the check frame FR. By referring to such the forwarding table 22, the forwarding processing unit 21 is able to forward the received check frame FR to the designated forwarding destination. At this time, the input port and the header information (MAC DA, MAC SA) are used as a search keyword for the associated output port. As an example, let us consider a case where the forwarding processing unit 21 receives the check frame FR (MAC DA=00-00-4c-00-aa-00, MAC SA=00-00-4c-00-12-34) from the host communication unit 23 (input port=HOST). In this case, the first entry in the forwarding table 22 becomes a hit entry. Therefore, the forwarding processing unit 21 forwards the check frame FR to the output port 27 indicated by the hit entry. That is, the check frame FR transmitted from the management host 1 is output to the physical link 71 connected to the output port 27 and thus forwarded to the switch 4. In this manner, the forwarding of the check frame FR is achieved.

In the switch 3, the table setup unit 34 receives the table setup command from the host communication unit 33. Then, the table setup unit 34 sets, in accordance with the table setup command, the contents of the forwarding table 32 stored in the table storage unit 30. FIG. 10 shows the forwarding table 32 in the present example.

In the switch 4, the table setup unit 44 receives the table setup command from the host communication unit 43. Then, the table setup unit 44 sets, in accordance with the table setup command, the contents of the forwarding table 42 stored in the table storage unit 40. FIG. 11 shows the forwarding table 42 in the present example.

In the switch 5, the table setup unit 54 receives the table setup command from the host communication unit 53. Then, the table setup unit 54 sets, in accordance with the table setup command, the contents of the forwarding table 52 stored in the table storage unit 50. FIG. 12 shows the forwarding table 52 in the present example.

Figure 13:
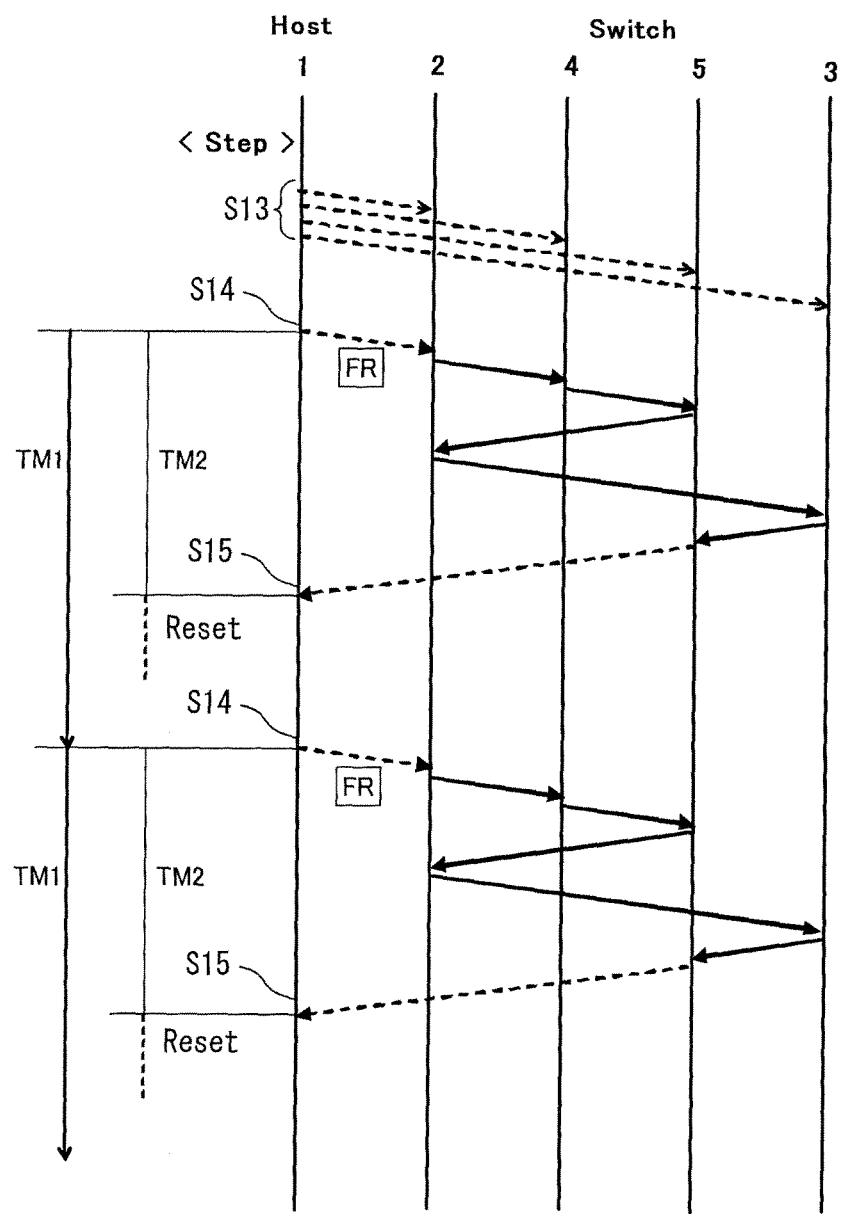
FIG. 13 shows frame forwarding processing at normal times.

Step S14:

After the Step S13 is completed, the monitoring unit 14 of the management host 1 periodically performs transmission of the check frame FR. The forwarding processing unit of each switch, when receiving the check frame FR, forwards the check frame FR. FIG. 13 shows transmission and forwarding processing of the check frame FR at normal times. In FIG. 13, dashed arrows indicate communications by using the control links 62 to 65, and solid arrows indicate communications by using the physical links 71 to 75.

First, the monitoring unit 14 generates a check frame FR as shown in FIG. 8. Subsequently, the monitoring unit 14 refers to the route table RTE shown in FIG. 7 to transmit the check frame FR to the first switch on the transfer route PW, i.e. the switch 2 (first switch). At this time, the sequence number A of the check frame FR for transmission is set to "1". Moreover, the monitoring unit 14 starts a first timer TM1 and a second timer TM2 at the same time as the transmission of the check frame FR. The first timer TM1 is used for performing the periodical transmission of the check frame FR. That is, the monitoring unit 14 performs the transmission of the check frame FR at a predetermined interval counted by the first timer TM1. The second timer TM2 is used for processing of detecting failure occurrence which will be described later. A set time of the second timer TM2 is substantially longer than a set time of the first timer TM1.

The check frame FR is transmitted from the node communication unit 15 of the management host 1 through the control link 62 to reach the host communication unit 23 of the switch 2 (first switch). The forwarding processing unit 21 receives the check frame FR from the host communication unit 23. The forwarding processing unit 21 refers to the forwarding table 22 shown in FIG. 9 to forward the received check frame FR to the port 27 (i.e. switch 4).

The check frame FR is transmitted from the port 27 of the switch 2 through the physical link 71 to reach the port 47 of the switch 4 (second switch). The forwarding processing unit 41 receives the check frame FR from the port 47. The forwarding processing unit 41 refers to the forwarding table 42 shown in FIG. 11 to forward the received check frame FR to the port 49 (i.e. switch 5).

The check frame FR is transmitted from the port 49 of the switch 4 through the physical link 72 to reach the port 57 of the switch 5 (third switch). The forwarding processing unit 51 receives the check frame FR from the port 57. The forwarding processing unit 51 refers to the forwarding table 52 shown in FIG. 12 to forward the received check frame FR to the port 58 (i.e. switch 2).

The check frame FR is transmitted from the port 58 of the switch 5 through the physical link 73 to reach the port 28 of the switch 2 (fourth switch). The forwarding processing unit 21 receives the check frame FR from the port 28. The forwarding processing unit 21 refers to the forwarding table 22 shown in FIG. 9 to forward the received check frame FR to the port 29 (i.e. switch 3).

The check frame FR is transmitted from the port 29 of the switch 2 through the physical link 74 to reach the port 37 of the switch 3 (fifth switch). The forwarding processing unit 31 receives the check frame FR from the port 37. The forwarding processing unit 31 refers to the forwarding table 32 shown in FIG. 10 to forward the received check frame FR to the port 39 (i.e. switch 5).

The check frame FR is transmitted from the port 39 of the switch 3 through the physical link 75 to reach the port 59 of the switch 5 (sixth switch). The forwarding processing unit 51 receives the check frame FR from the port 59. The forwarding processing unit 51 refers to the forwarding table 52 shown in FIG. 12 to forward the received check frame FR to the host communication unit 53 (i.e. management host 1).

The check frame FR is transmitted from the host communication unit 53 of the switch 5 (sixth switch) through the control link 65 to reach the node communication unit 15 of the management host 1. In this manner, the transfer (travel) of the check frame FR along the transfer route PW is achieved.

Step S15:

The monitoring unit 14 of the management host 1 monitors arrival of the check frame FR. In the case of the example shown in FIG. 13, the check frame FR returns back to the management host 1 from the switch 5 (sixth switch) without being lost on the way. In this case, the monitoring unit 14 receives the check frame FR before the sufficiently long second timer TM2 expires. That is, the monitoring unit 14 receives the check frame FR from the sixth switch within a predetermined period of time counted by the second timer TM2 after transmitting the check frame FR to the first switch. In this case, the monitoring unit 14 resets the second timer TM2 and determines that no failure is occurring on the transfer route PW (Step S20; No).

After that, when the first timer TM1 expires, the monitoring unit 14 transmits a new check frame FR. Then, the Steps S14 and S15 are repeated. In this manner, at normal times, the check frame FR periodically travels the transfer route PW and whether or not a failure is occurring is judged every travel.

Figure 14:
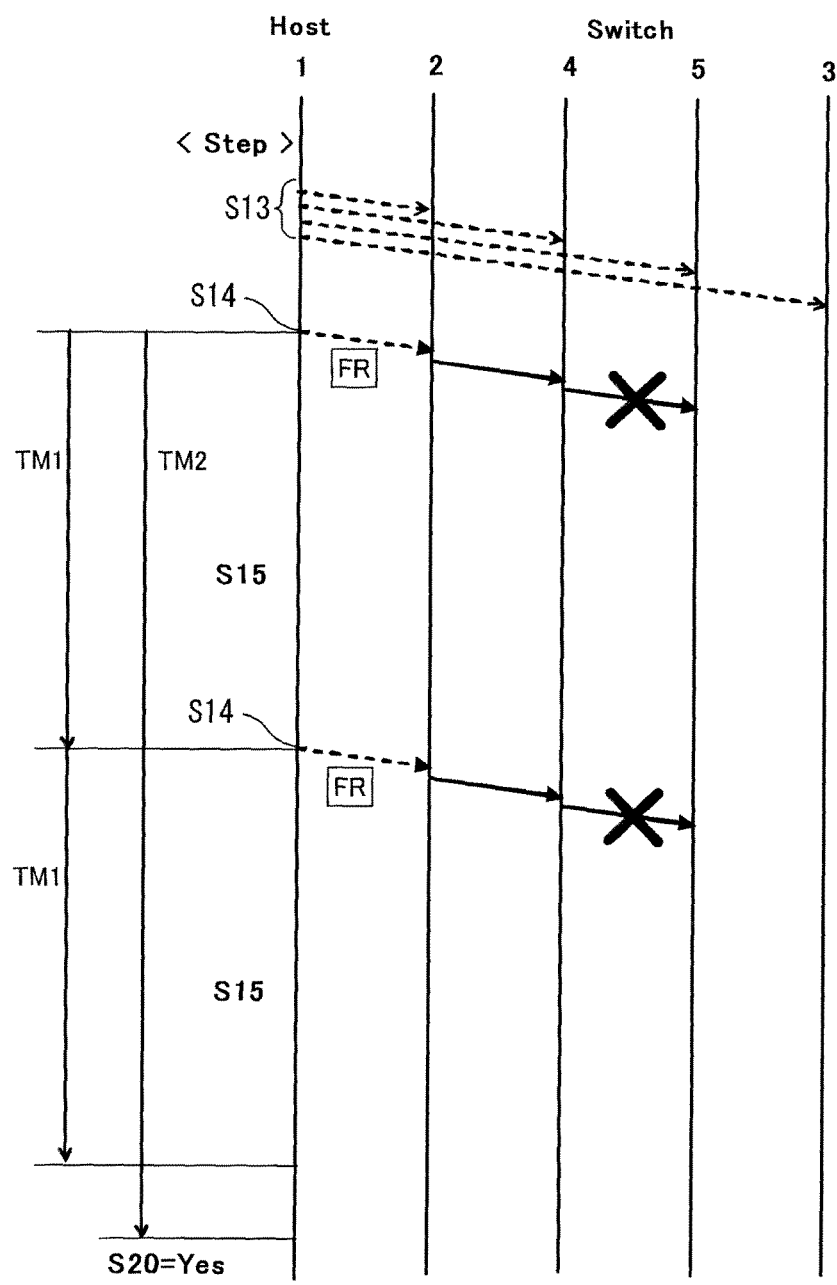
FIG. 14 shows frame forwarding processing when a failure is occurring.

FIG. 14 shows a case where a failure is occurring at a part of the transfer route PW. As an example, let us consider a case where a failure occurs at the physical link 72 between the switch 4 and the switch 5 and the bi-directional communication there becomes impossible. As in the case of FIG. 13, the monitoring unit 14 periodically transmits the check frame FR. However, since the failure occurs at the physical link 72, the check frame FR is not transferred from the switch 4 to the switch 5. Therefore, the second timer TM2 expires without the monitoring unit 14 receiving the check frame FR. That is, the monitoring unit 14 does not receive the check frame FR from the sixth switch within a predetermined period of time counted by the second timer TM2 after transmitting the check frame FR to the first switch. In this case, the monitoring unit 14 determines that a failure is occurring somewhere on the transfer route PW (Step S20; Yes).

In this manner, the monitoring unit 14 can detect failure occurrence on the transfer route PW by monitoring reception state of the check frame FR. When the failure occurrence is detected, the monitoring unit 14 instructs the display unit 16 to display that effect. The display unit 16 displays the physical topology indicated by the topology table TPL, the transfer route PW indicated by the route table RTE and the failure occurrence on the transfer route PW. If the failure occurrence is detected by the monitoring unit 14, the processing proceeds to identification of location of the failure (Step S100).

4. Identification of Location of Failure (Step S100)

The failure location identification processing according to the present exemplary embodiment will be described hereinafter. Let us consider a case where the location of failure is the physical link 72 from the second switch (switch 4) toward the third switch (switch 5). Various algorithms for identifying the location of failure are possible as follows.

4-1. First Example

Figure 15:
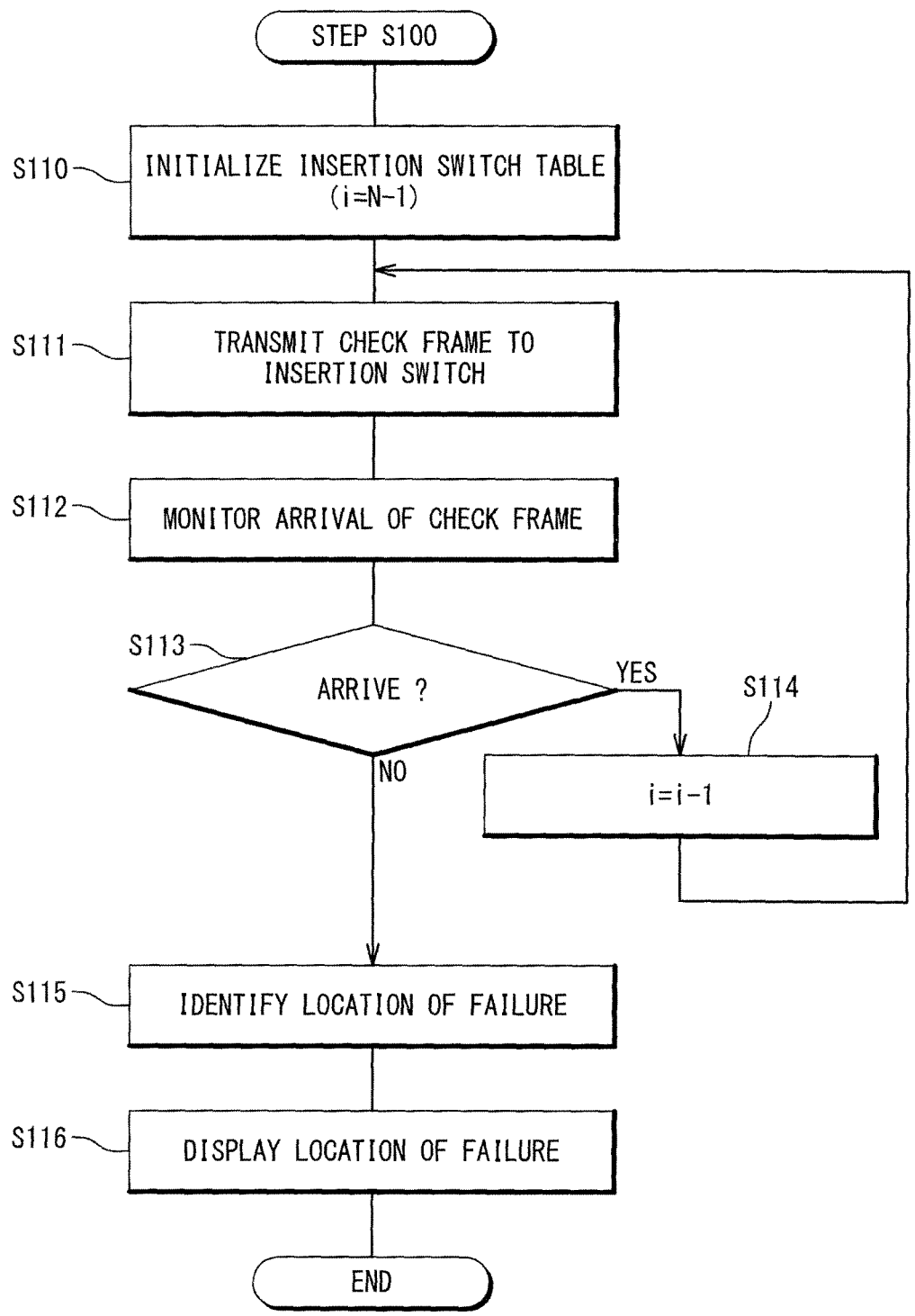
FIG. 15 is a flow chart showing a first example of failure location identification processing.
Figure 17:
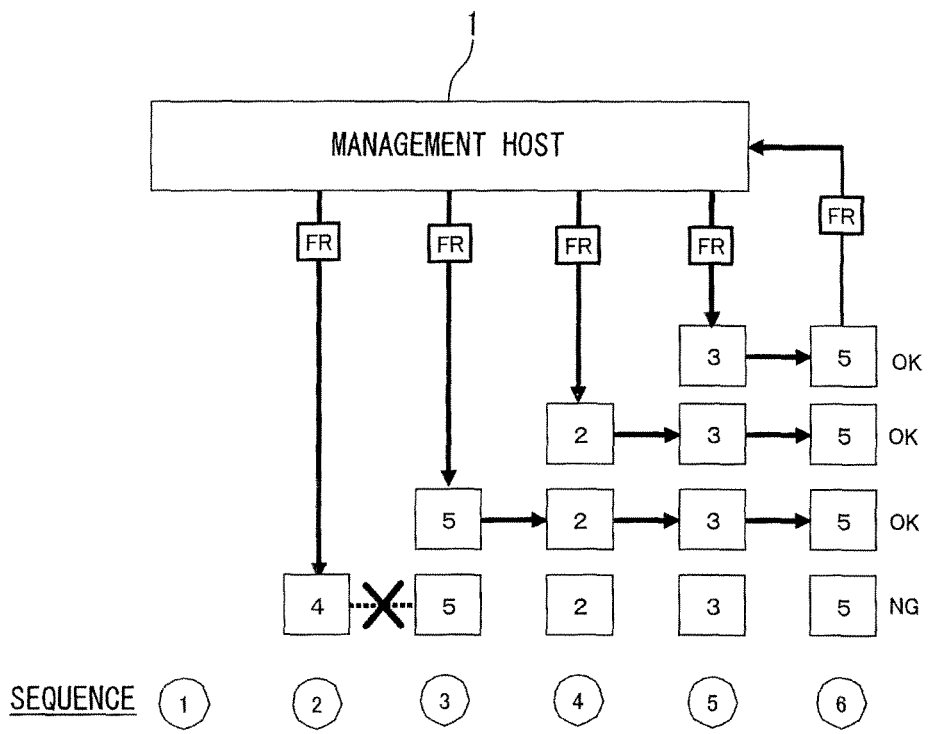
FIG. 17 shows the failure location identification processing in the first example.

FIG. 15 is a flow chart showing a first example of Step S100. FIG. 16 shows an insertion switch table INS used in Step S100. In the present example, the insertion switch table INS indicates the sequence number i of the insertion switch. FIG. 17 conceptually shows forwarding of the check frame FR in the present example.

Step S110:

First, the monitoring unit 14 refers to the route table RTE to initialize the insertion switch table INS stored in the storage unit 10. In the present example, a switch whose sequence number is immediately before the final sequence number in the transfer route PW indicated by the route table RTE is set as an initial insertion switch. That is, the initial insertion switch is set to the fifth switch immediately before the end-point (N-th switch) of the transfer route PW. The monitoring unit 14 sets the sequence number i in the insertion switch table INS to "5 (=N−1)".

Steps S111 to S114:

Next, the monitoring unit 14 refers to the insertion switch table INS and the route table RTE to transmit a check frame FR to the insertion switch (Step S111). More specifically, the monitoring unit 14 reads the sequence number i of the insertion switch from the insertion switch table INS, and reads the "stopover switch" and the "output port" associated with the sequence number i from the route table RTE. Then, the monitoring unit 14 transmits the check frame FR to the stopover switch (i.e. the insertion switch) with specifying the output port. At this time, the sequence number A of the transmitted check frame FR is set to be equal to the sequence number i of the insertion switch. Moreover, the monitoring unit 14 starts the second timer TM2 at the same time as the transmission of the check frame FR to the insertion switch.

The initial insertion switch is the fifth switch (i=5). Therefore, the monitoring unit 14 reads "stopover switch=3" and "output port=39" from the route table RTE. Then, the monitoring unit 14 transmits the check frame FR (A=5) to the switch 3 (fifth switch) with specifying "output port=39". The switch 3, when receiving the check frame FR from the management host 1, outputs the check frame FR from the specified "output port=39". That is, the check frame FR is forwarded to the switch 5 (sixth switch). The switch 5 forwards the received check frame FR to the management host 1, as in the case of the normal time.

The monitoring unit 14 monitors arrival of the transmitted check frame FR (Step S112). In the case where the insertion switch is the fifth switch (i=5), the monitoring unit 14 receives the check frame FR from the sixth switch before the second timer TM2 expires (Step S113; Yes). In this case, the monitoring unit 14 resets the second timer TMs and rewrites the insertion switch table INS to change the insertion switch. More specifically, the monitoring unit 14 decreases the sequence number i of the insertion switch by 1 (Step S114). In other words, the monitoring unit 14 changes the insertion switch to the preceding one along the transfer route PW. After that, the processing returns back to Step S111.

In the case where the insertion switch is the fourth switch (i=4), the processing is carried out in a similar way and the monitoring unit 14 receives the check frame FR from the sixth switch (Step S113; Yes). As a result, the insertion switch is changed to the third switch (i=3). Also in the case where the insertion switch is the third switch (i=3), the processing is carried out in a similar way and the monitoring unit 14 receives the check frame FR from the sixth switch (Step S113; Yes). As a result, the insertion switch is changed to the second switch (i=2).

In the case where the insertion switch is the second switch (i=2), the monitoring unit 14 transmits the check frame FR (A=2) to the switch 4 (second switch) with specifying "output port=49". The switch 4, when receiving the check frame FR from the management host 1, outputs the check frame FR from the specified "output port=49". However, the failure is occurring between the switch 4 and the switch 5 and thus the check frame FR does not reach the switch 5 (third switch). In this case, the monitoring unit 14 fails to receive the check frame FR from the sixth switch before the second timer TM2 expires (Step S113; No).

Step S115:

The second timer TM2 expires while the monitoring unit 14 does not receive the check frame FR. At this time, the sequence number i of the insertion switch indicated by the insertion switch table INS is "2". The monitoring unit 14 refers to the insertion switch table INS and determines that the failure is occurring between the second switch (i=2) and the subsequent third switch (i=3). Further, the monitoring unit 14 can convert the second switch (i=2) and the third switch (i=3) to the switch 4 and the switch 5, respectively, by referring to the route table RTE. That is, the monitoring unit 14 can determine that the failure is occurring between the switch 4 and the switch 5.

When the location of failure is identified, the monitoring unit 14 updates the status flag in the topology table TPL stored in the storage unit 10. More specifically, the status flag of the entry "source switch=4, source port=49, end-point switch=5, end-point port=57" associated with the physical link 72 from the switch 4 to the switch 5 is updated to "0 (not available)".

Step S116:

The monitoring unit 14 instructs the display unit 16 to display the identified location of failure. The display unit 16 refers to the topology table TPL and displays the link whose status flag is "0" as the location of failure.

According to the first example, as described above, the monitoring unit 14 searches for the location of failure in a linear manner from the end-point of the transfer route PW toward the upstream. More specifically, the monitoring unit 14 changes the insertion switch in turn from the (N−1)-th switch towards the first switch until the monitoring unit 14 fails to receive the check frame FR from the N-th switch. The insertion switch when the monitoring unit 14 fails to receive the check frame from the N-th switch is a k-th switch. In this case, the monitoring unit 14 determines that the failure is occurring between the k-th switch and the (k+1)-th switch. When a total of N switches exist along the transfer route PW, the number of links on the transfer route PW is N−1. Therefore, the monitoring unit 14 can identify the location of failure by the frame transmission for (N−1)/2 times on average and N−1 times at a maximum.

4-2. Second Example

Figure 18:
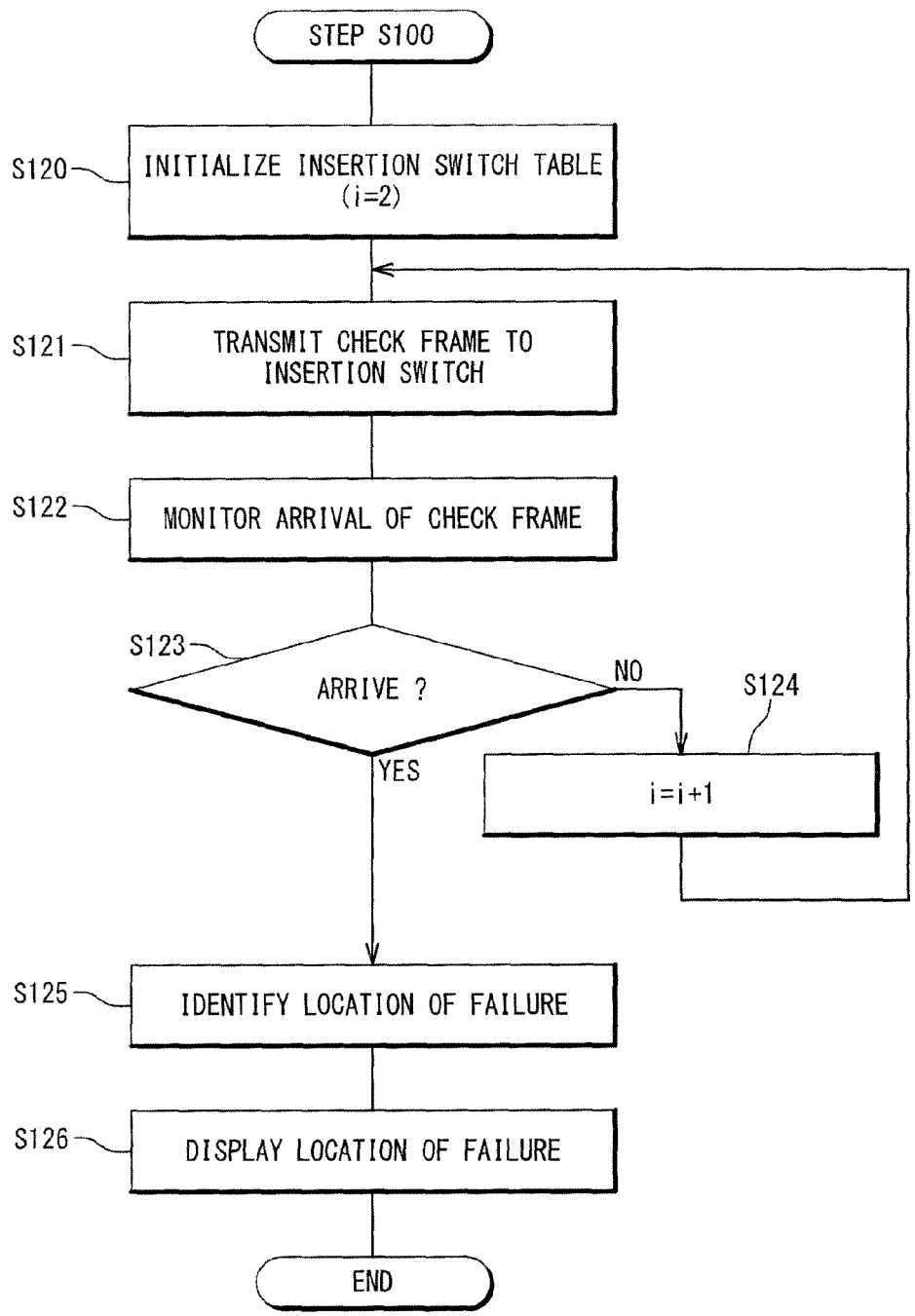
FIG. 18 is a flow chart showing a second example of failure location identification processing.
Figure 19:
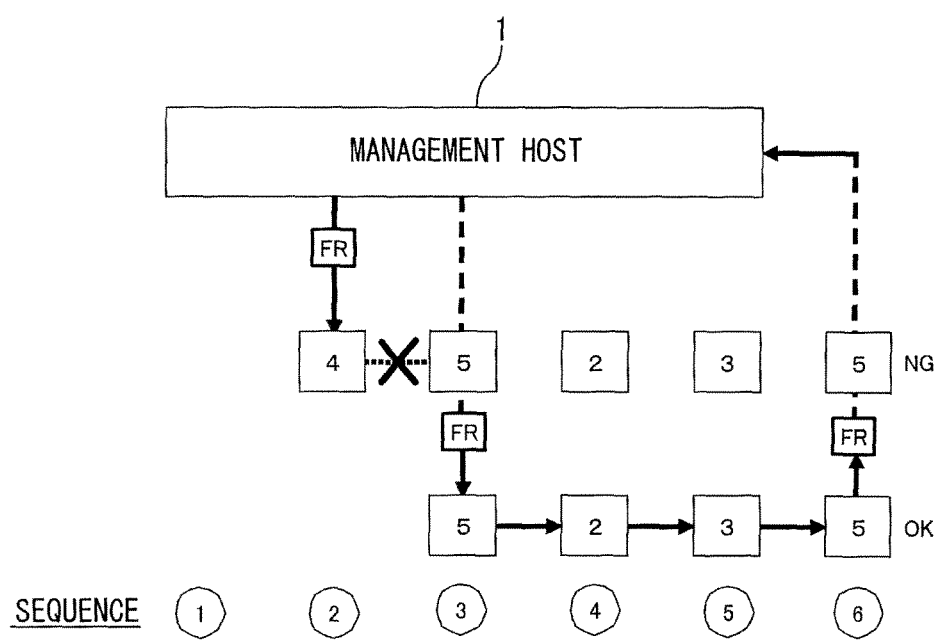
FIG. 19 shows the failure location identification processing in the second example.

In a second example, the monitoring unit 14 searches for the location of failure from the start-point of the transfer route PW toward the downstream, which is the opposite to the case of the first example. FIG. 18 and FIG. 19 respectively show a flow chart and forwarding of the check frame FR in the second example. The insertion switch table INS used in the present example is the same as that in the first example (refer to FIG. 16). An overlapping description with the first example will be omitted as appropriate.

Step S120:

First, the monitoring unit 14 refers to the route table RTE to initialize the insertion switch table INS stored in the storage unit 10. In the present example, a switch whose sequence number is immediately after the initial sequence number in the transfer route PW indicated by the route table RTE is set as an initial insertion switch. That is, the initial insertion switch is set to the second switch immediately after the start-point (first switch) of the transfer route PW. The monitoring unit 14 sets the sequence number i in the insertion switch table INS to "2".

Steps S121 to S124:

Next, the monitoring unit 14 refers to the insertion switch table INS and the route table RTE to transmit a check frame FR to the insertion switch (Step S121). Moreover, the monitoring unit 14 monitors arrival of the transmitted check frame FR (Step S122). The transmission and forwarding of the check frame FR are the same as those in Step S111 in the first example.

In the case where the insertion switch is the second switch (i=2), the monitoring unit 14 transmits the check frame FR (A=2) to the switch 4 (second switch) with specifying "output port=49". The switch 4, when receiving the check frame FR from the management host 1, outputs the check frame FR from the specified "output port=49". However, the failure is occurring between the switch 4 and the switch 5 and thus the check frame FR does not reach the switch 5 (third switch). In this case, the monitoring unit 14 fails to receive the check frame FR from the sixth switch before the second timer TM2 expires (Step S123; No). In this case, the monitoring unit 14 rewrites the insertion switch table INS to change the insertion switch. More specifically, the monitoring unit 14 increases the sequence number i of the insertion switch by 1 (Step S124). In other words, the monitoring unit 14 changes the insertion switch to the subsequent one along the transfer route PW. After that, the processing returns back to Step S121.

In the case where the insertion switch is the third switch (i=3), the check frame FR is forwarded from the third switch to the sixth switch in order and returns back to the management host 1. That is, the monitoring unit 14 receives the check frame FR from the sixth switch before the second timer TM2 expires (Step S123; Yes).

Steps S125 to S126:

When the monitoring unit 14 receives the check frame FR, the sequence number i of the insertion switch indicated by the insertion switch table INS is "3". The monitoring unit 14 refers to the insertion switch table INS and determines that the failure is occurring between the third switch (i=3) and the preceding second switch (i=2). Further, the monitoring unit 14 can convert the second switch (i=2) and the third switch (i=3) to the switch 4 and the switch 5, respectively, by referring to the route table RTE. That is, the monitoring unit 14 can determine that the failure is occurring between the switch 4 and the switch 5.

When the location of failure is identified, the monitoring unit 14 updates the status flag in the topology table TPL as in the case of the first example. Moreover, the monitoring unit 14 instructs the display unit 16 to display the identified location of failure. The display unit 16 refers to the topology table TPL and displays the link whose status flag is "0" as the location of failure.

According to the second example, as described above, the monitoring unit 14 searches for the location of failure in a linear manner from the start-point of the transfer route PW toward the downstream. More specifically, the monitoring unit 14 changes the insertion switch in turn from the second switch towards the N-th switch until the monitoring unit 14 receives the check frame FR from the N-th switch. The insertion switch when the monitoring unit 14 receives the check frame from the N-th switch is a k-th switch. In this case, the monitoring unit 14 determines that the failure is occurring between the (k−1)-th switch and the k-th switch. An efficiency of identifying the location of failure is the same as in the case of the first example.

4-3. Third Example

In a third example, a "search range" in which the location of failure is searched for is defined. The search range can be said be to an interval where the failure is considered to be occurring. By gradually narrowing the search range, the location of failure can be identified. A start-point switch and an end-point switch of the search range are hereinafter referred to as a "range start switch" and a "range end switch", respectively. When the sequence number on the transfer route PW is used, the range start switch is expressed as a s-th switch, and the range end node is expressed as a e-th switch. Here, the "s" is in a range from 1 to N−1. The "e" is in a range from 2 to N and is larger than "s".

Figure 20:
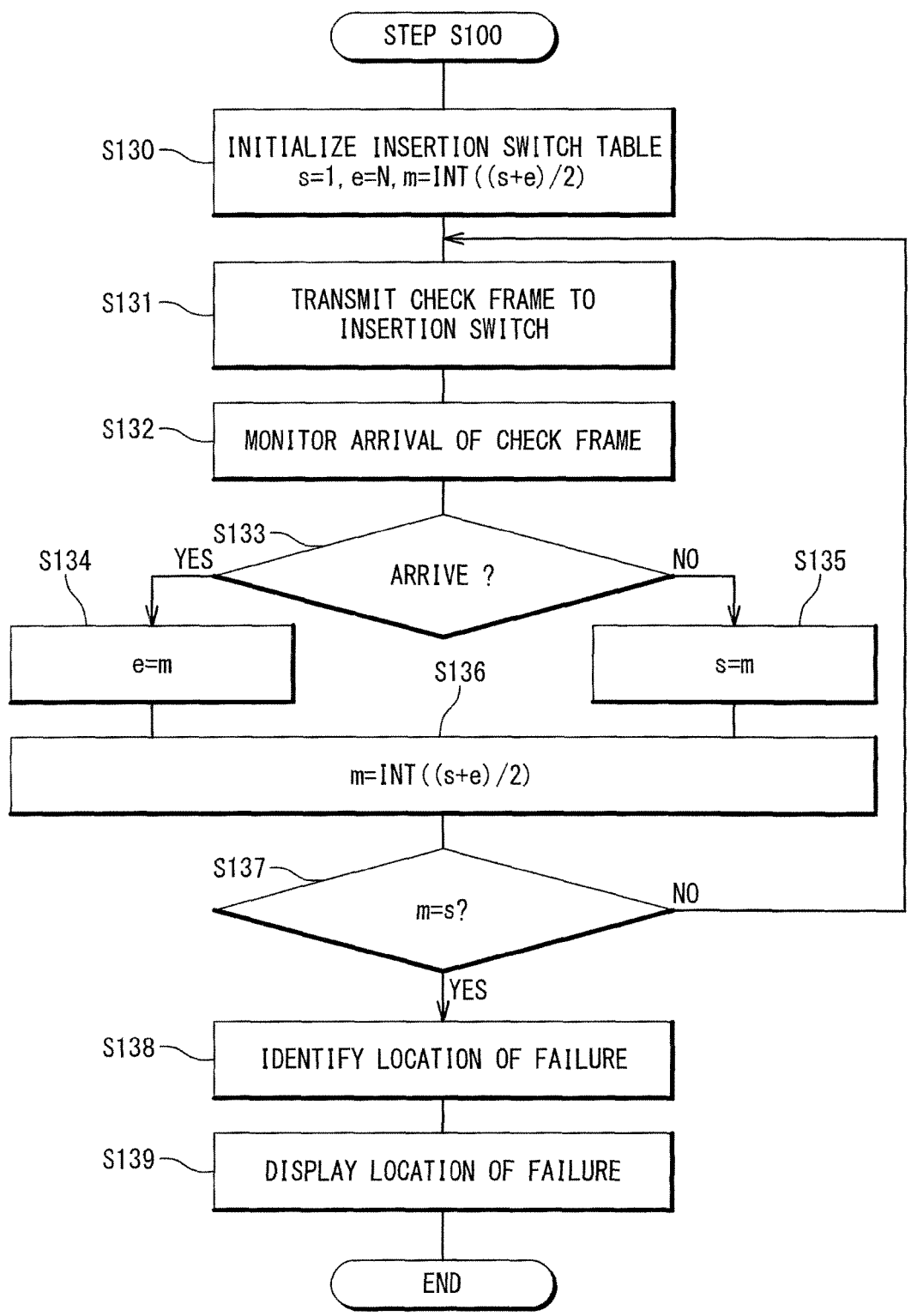
FIG. 20 is a flow chart showing a third example of failure location identification processing.
Figure 22:
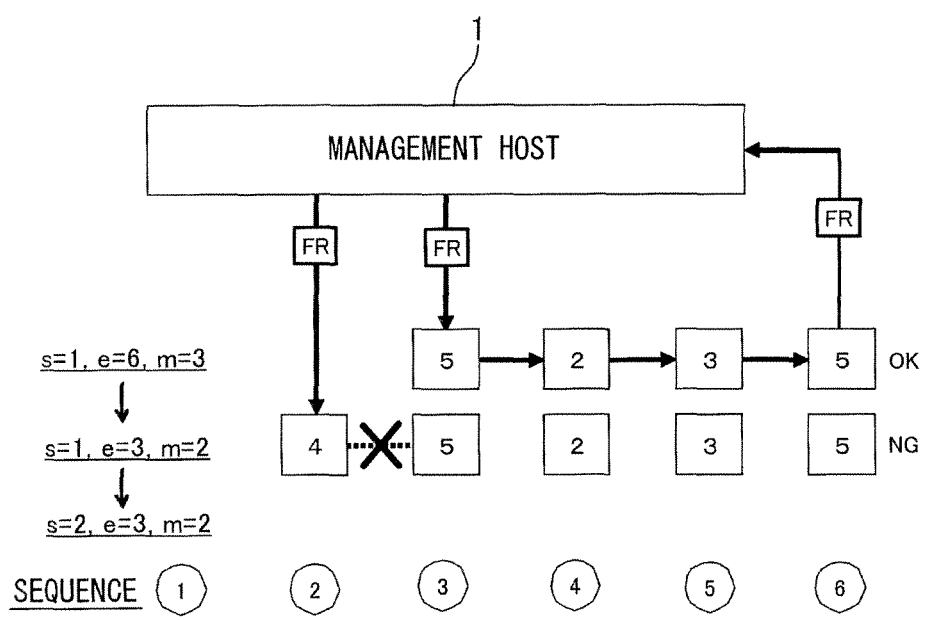
FIG. 22 shows the failure location identification processing in the third example.

FIG. 20 is a flow chart in the third example. FIG. 21 shows the insertion switch table INS used in the third example. In the present example, the insertion switch table INS indicates the sequence numbers (s, e) of the range start switch and the range end switch in addition to the sequence number m of the insertion switch. FIG. 22 conceptually shows forwarding of the check frame FR in the present example. An overlapping description with the first example will be omitted as appropriate.

Step S130:

First, the monitoring unit 14 refers to the route table RTE to initialize the insertion switch table INS stored in the storage unit 10. More specifically, the monitoring unit 14 initially sets the start-point (first switch) and the end-point (sixth switch) of the transfer route PW as the range start switch and the range end switch, respectively (s=1, e=6). This is equivalent to the maximum search range.

Moreover, the monitoring unit 14 sets any switch (intermediate switch=m-th switch) between the range start switch (s-th switch) and the range end switch (e-th switch) as the insertion switch. Here, any switch can be selected as long as it exists between the range start switch and the range end switch. However, from a viewpoint of the efficiency of identifying the location of failure, it is preferable that a switch located at nearly middle of the range start switch and the range end switch is set as the insertion switch. In this case, the "m" is a maximum natural number not more than (s+e)/2, which can be expressed by the following Equation (1).

$$m = INT((s+e)/2)$$   Equation (1)

This is equivalent to the binary search. In the initial setting stage, s=1, e=6, and m is set to 3. That is, the insertion switch is set to the third switch.

Steps S131 to S137:

Next, the monitoring unit 14 refers to the insertion switch table INS and the route table RTE to transmit a check frame FR to the insertion switch (Step S131). Moreover, the monitoring unit 14 monitors arrival of the transmitted check frame FR (Step S132). The transmission and forwarding of the check frame FR are the same as those in Step S111 in the first example.

In the case where the insertion switch is the third switch (m=3), the monitoring unit 14 transmits the check frame FR (A=3) to the switch 5 (third switch) with specifying "output port=58". The check frame FR is forwarded from the third switch to the sixth switch in order and returns back to the management host 1. That is, the monitoring unit 14 receives the check frame FR from the sixth switch before the second timer TM2 expires (Step S133; Yes). In this case, the monitoring unit 14 determines that the transfer route after the current insertion switch is normal and newly sets the current insertion switch (intermediate switch) as the range end switch (Step S134). That is, the monitoring unit 14 updates the "e" in the insertion switch table INS to the current m=3. Furthermore, the monitoring unit 14 recalculates the "m" in accordance with the above-mentioned Equation (1) (Step S136). As a result, the insertion switch is changed from the third switch (m=3) to the second switch (m=2). If "m" and "s" are different from each other (Step S137; No), the processing returns back to Step S131.

In the case where the insertion switch is the second switch (m=2), the monitoring unit 14 transmits the check frame FR (A=2) to the switch 4 (second switch) with specifying "output port=49". The switch 4, when receiving the check frame FR from the management host 1, outputs the check frame FR from the specified "output port=49". However, the failure is occurring between the switch 4 and the switch 5 and thus the check frame FR does not reach the switch 5 (third switch). In this case, the monitoring unit 14 fails to receive the check frame FR from the sixth switch before the second timer TM2 expires (Step S133; No). In this case, the monitoring unit 14 determines that the failure exists after the current insertion switch and newly sets the current insertion switch (intermediate switch) as the range start switch (Step S135). That is, the monitoring unit 14 updates the "s" in the insertion switch table INS to the current m=2. Furthermore, the monitoring unit 14 recalculates the "m" in accordance with the above-mentioned Equation (1) (Step S136). As a result, the "m" becomes 2.

Steps S138 to S139:

Here, the "m" and the "s" both become 2. If the and the "s" are equal to each other (Step S137; Yes), it means that there is no switch between the range start switch and the range end switch. In other words, the search range is narrowed to the limit. Therefore, the monitoring unit 14 can determine that the failure is occurring between the current range start switch and the current range end switch. That is, the monitoring unit 14 refers to the current insertion switch table INS and determines that the failure is occurring between the second switch (s=2) and the third switch (e=3). Further, the monitoring unit 14 can convert the second switch (s=2) and the third switch (e=3) to the switch 4 and the switch 5, respectively, by referring to the route table RTE. That is, the monitoring unit 14 can determine that the failure is occurring between the switch 4 and the switch 5.

When the location of failure is identified, the monitoring unit 14 updates the status flag in the topology table TPL as in the case of the first example. Moreover, the monitoring unit 14 instructs the display unit 16 to display the identified location of failure. The display unit 16 refers to the topology table TPL and displays the link whose status flag is "0" as the location of failure.

According to the third example, as described above, the monitoring unit 14 searches for the location of failure by gradually narrowing the search range. In the case of the binary search, the monitoring unit 14 can identify the location of failure by the frame transmission for log 2(N−1) times on average and log 2(N−1)+1 times at a maximum. Therefore, the efficiency is improved as compared with the case of the first example. The present example is particularly preferable in a case where the total number N of the switches on the transfer route PW is large.

4-4. Fourth Example

In the fourth example, the search range is defined, as in the case of the third example. Although one intermediate switch within the search range is set as the insertion switch in the case of the third example, a plurality of intermediate switches within the search range are concurrently set as the insertion switches in the case of the fourth example. Therefore, the check frame FR is concurrently transmitted to the plurality of insertion switches (intermediate switches).

Figure 23:
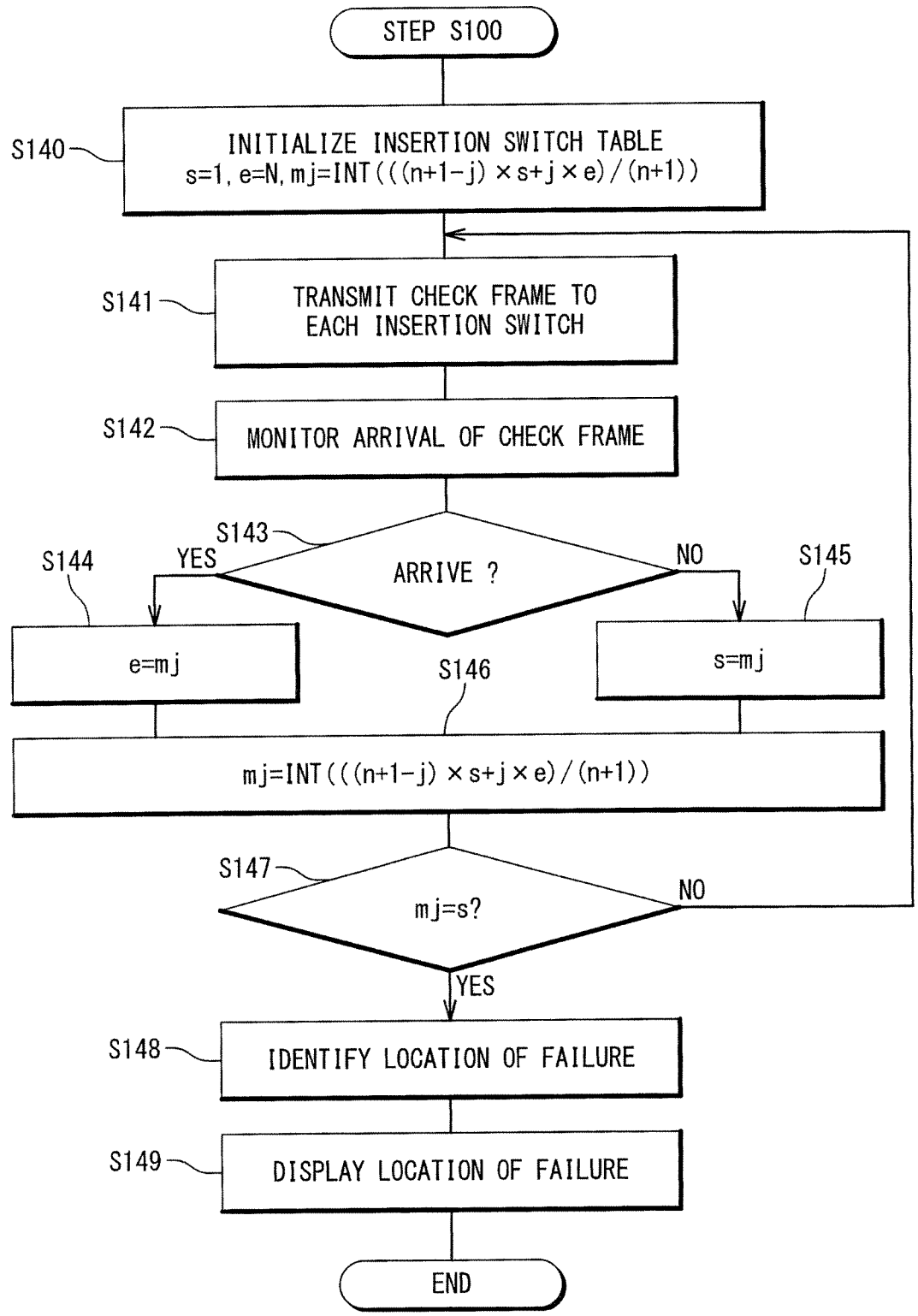
FIG. 23 is a flow chart showing a fourth example of failure location identification processing.
Figure 25:
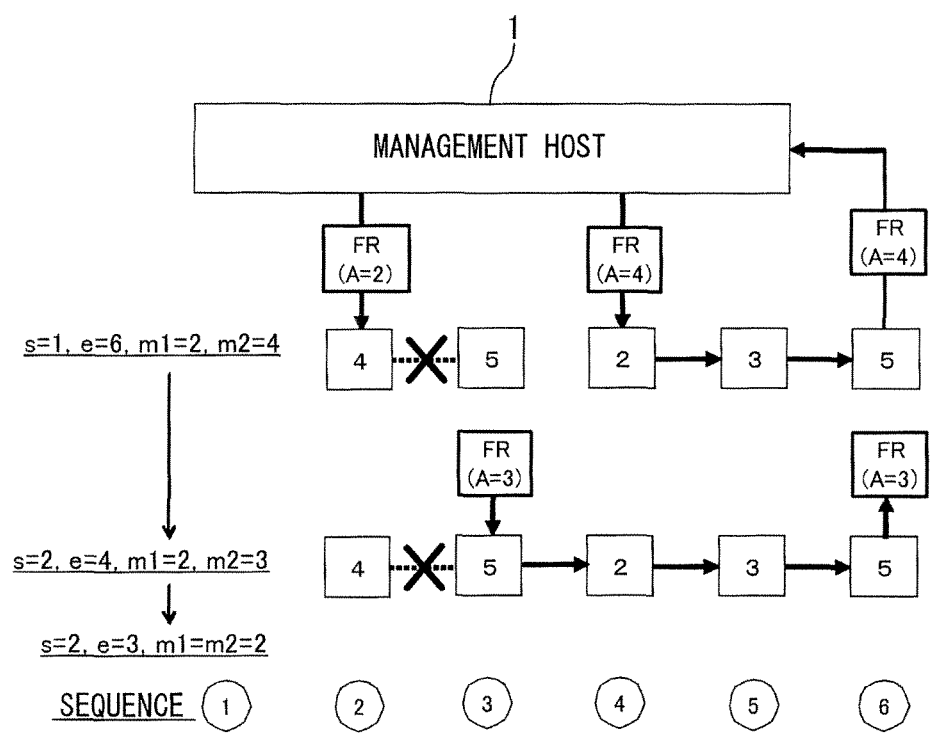
FIG. 25 shows the failure location identification processing in the fourth example.

FIG. 23 is a flow chart in the fourth example. FIG. 24 shows the insertion switch table INS used in the fourth example. In the present example, the insertion switch table INS indicates the sequence numbers mj (j=1 to n; n is an integer equal to or more than 2) of the n insertion switches and the sequence numbers (s, e) of the range start switch and the range end switch. FIG. 25 conceptually shows forwarding of the check frame FR in the present example. An overlapping description with the first example will be omitted as appropriate.

Step S140:

First, the monitoring unit 14 refers to the route table RTE to initialize the insertion switch table INS stored in the storage unit 10. More specifically, the monitoring unit 14 initially sets the start-point (first switch) and the end-point (sixth switch) of the transfer route PW as the range start switch and the range end switch, respectively (s=1, e=6). This is equivalent to the maximum search range.

Moreover, the monitoring unit 14 sets n intermediate switches (m1-th to mn-th switches) between the range start switch (s-th switch) and the range end switch (e-th switch) as the insertion switches. Here, any switch can be selected as long as it exists between the range start switch and the range end switch. However, from a viewpoint of the efficiency of identifying the location of failure, it is preferable that the n intermediate switches are so selected as to divide the search range into (n+1) sections at substantially regular intervals. In this case, mj (j=1 to n) is a maximum natural number not more than $((n+1-j) \times s + j \times e)/(n+1)$, which can be expressed by the following Equation (2).

$$mj = INT(((n+1-j) \times s + j \times e)/(n+1)) \quad \text{Equation (2)}$$

Hereinafter, let us consider a case where n=2. In this case, two intermediate switches (m1-th switch, m2-th switch) become the insertion switches at the same time. In the initial setting stage, s=1, e=6, and the "m1" and the "m2" are respectively calculated to be 2 and 4 according to the Equation (2). That is, the insertion switches are set to the second switch (first intermediate switch) and the fourth switch (second intermediate switch).

Steps S141 to S147:

Next, the monitoring unit 14 refers to the insertion switch table INS and the route table RTE to transmit a check frame FR concurrently to the respective insertion switches (Step S141). Moreover, the monitoring unit 14 monitors arrival of the transmitted check frame FR (Step S142). The transmission and forwarding of the check frame FR are the same as those in Step S111 in the first example.

The monitoring unit 14 transmits a check frame FR (A=4) whose sequence number A is set to "4" to the fourth switch (m2=4). The check frame FR (A=4) is forwarded from the fourth switch to the sixth switch in order and returns back to the management host 1. That is, the monitoring unit 14 receives the check frame FR (A=4) from the sixth switch before the second timer TM2 expires (Step S143; Yes). In this case, the monitoring unit 14 determines that the transfer route after the fourth switch (m2=4) is normal and newly sets the fourth switch as the range end switch (Step S144). That is, the monitoring unit 14 updates the "e" in the insertion switch table INS to the current m2=4.

Also, the monitoring unit 14 transmits a check frame FR (A=2) whose sequence number A is set to "2" to the second switch (m1=2). The check frame FR (A=2) is not transferred from the second switch to the third switch and does not return back to the management host 1. That is, the monitoring unit 14 fails to receive the check frame FR (A=2) from the sixth switch before the second timer TM2 expires (Step S143; No). In this case, the monitoring unit 14 determines that the failure exists after the second switch (m1=2) and newly sets the second switch as the range start switch (Step S145). That is, the monitoring unit 14 updates the "s" in the insertion switch table INS to the current m1=2.

When the second timer TM2 expires, the monitoring unit 14 recalculates the "m" in accordance with the above-mentioned Equation (2) (Step S146). Currently s=2 and e=4, and the "m1" and the "m2" are respectively calculated to be 2 and 3 according to the Equation (2). That is, the insertion switches are set to the second switch and the third switch. If any of the "m1" and "m2" is different from the "s" (Step S147; No), the processing returns back to Step S141.

The monitoring unit 14 transmits a check frame FR (A=3) whose sequence number A is set to "3" to the third switch (m2=3). The check frame FR (A=3) is forwarded from the third switch to the sixth switch in order and returns back to the management host 1. That is, the monitoring unit 14 receives the check frame FR (A=3) from the sixth switch before the second timer TM2 expires (Step S143; Yes). In this case, the monitoring unit 14 determines that the transfer route after the third switch (m2=3) is normal and newly sets the third switch as the range end switch (Step S144). That is, the monitoring unit 14 updates the "e" in the insertion switch table INS to the current m2=3.

The second switch (m1=2) as the other insertion switch is the same as the range start switch (s=2). In this case, the monitoring unit 14 needs not to transmit the check frame FR to the second switch. It should be noted that the check frame FR has been already transmitted to the second switch in the previous processing and it has been confirmed that the check frame FR does not return back.

When the second timer TM2 expires, the monitoring unit 14 recalculates the "m" in accordance with the above-mentioned Equation (2) (Step S146). Currently s=2 and e=3, and the "m1" and the "m2" both are calculated to be 2 according to the Equation (2).

Steps S148 to S149:

Here, the "m1", the "m2" and the "s" all become 2. If the "m1", the "m2" and the "s" are equal to each other (Step S147; Yes), it means that there is no switch between the range start switch and the range end switch. In other words, the search range is narrowed to the limit. Therefore, the monitoring unit 14 can determine that the failure is occurring between the current range start switch and the current range end switch. That is, the monitoring unit 14 refers to the current insertion switch table INS and determines that the failure is occurring between the second switch (s=2) and the third switch (e=3). Further, the monitoring unit 14 can convert the second switch (s=2) and the third switch (e=3) to the switch 4 and the switch 5, respectively, by referring to the route table RTE. That is, the monitoring unit 14 can determine that the failure is occurring between the switch 4 and the switch 5.

When the location of failure is identified, the monitoring unit 14 updates the status flag in the topology table TPL as in the case of the first example. Moreover, the monitoring unit 14 instructs the display unit 16 to display the identified location of failure. The display unit 16 refers to the topology table TPL and displays the link whose status flag is "0" as the location of failure.

According to the fourth example, the efficiency is further improved as compared with the case of the third example. The present example is particularly preferable in a case where the total number N of the switches on the transfer route PW is large.

5. Effects

The present exemplary embodiment provides a technique of performing centralized management of the communication network NET by using the management host 1. In the communication network management processing, the management host 1 makes the check frame FR travel along a predetermined transfer route PW. Here, each switch (each node) in the communication network is provided with the forwarding table. The contents of the forwarding table are set up in accordance with the instruction from the management host 1 such that the check frame FR is forwarded along the predetermined transfer route PW. Therefore, each switch just needs to refer to the forwarding table to forward the received check frame FR to a designated forwarding destination. Thus, the traveling of the check frame FR along the predetermined transfer route PW is achieved. The management host 1 can detect whether or not a failure is occurring on the transfer route PW based on whether or not it receives the check frame FR within a predetermined period of time.

According to the present exemplary embodiment, there is no need to incorporate the health-check table including information of the transfer route, the check list and the like (see Patent Literature 2, Patent Literature 3) into the check frame FR. Therefore, each switch needs not to search for the related entry in the health-check table. In particular, even in a case of a large number of switches, there is no need to search for the related entry from a large number of entries, and thus a processing time in each switch is prevented from increasing. Moreover, each switch needs not to refer to the next entry following the related entry in order to forward the check frame FR to the next node. As a result, burden placed on each switch is reduced.

Moreover, according to the present exemplary embodiment, it is possible to identify the location of failure on the transfer route PW by simple processing. In the failure location identification processing, each switch on the transfer route PW just needs to forward the received check frame FR, as in the case of normal times. There is no need to change the setting of each switch for identifying the location of failure. Also, each switch needs not to write health-check information and the like to the check frame FR. Furthermore the complicated processing such as required in Patent Literature 2 or Patent Literature 3 is not necessary for identifying the location of failure. For example, such processing as described in Patent Literature 3 that each node investigates whether or not it can communicate with the next node is not necessary. Consequently, burden placed on each node is greatly reduced. According to the present exemplary embodiment, it is possible to identify the location of failure on the transfer route PW with simple processing and to reduce burden placed on each node.

Particularly, in a case where the node in the communication network is a switch with a simple configuration, the complicated processing such as required in Patent Literature 2 or Patent Literature 3 is substantially impossible. The present exemplary embodiment can be applied to the case where the node in the communication network is a switch.

Moreover, in the case where the transfer route PW of the check frame FR is a traversable route, health-checking of a large number of physical links is possible by only transmitting one check frame FR. It is therefore possible to reduce the number of check frames FR that the management host 1 needs to transmit and receive. As a result, burden placed on the management host 1 is reduced, which is preferable. Furthermore, since the burden placed on the management host 1 is reduced, it is possible to increase a transmission frequency of the check frame FR. As a result, it is possible to quickly detect failure occurrence on the transfer route PW.

Moreover, according to the present exemplary embodiment, a ring-shaped network structure is not assumed for achieving the traveling of the check frame FR. The present exemplary embodiment can be applied to a case where the physical topology of the communication network NET is not a ring shape. There is no constraint on the physical topology of the communication network NET.

While the exemplary embodiments of the present invention have been described above with reference to the attached drawings, the present invention is not limited to these exemplary embodiments and can be modified as appropriate by those skilled in the art without departing from the spirit and scope of the present invention.

This application is based upon and claims the benefit of priority from Japanese patent application No. 2009-043112, filed on Feb. 25, 2009, the disclosure of which is incorporated herein in its entirely by reference.

The invention claimed is:

1. A communication network management system, comprising:
 a communication network including a plurality of nodes and a plurality of links connecting between said plurality of nodes; and
 a management computer configured to manage said communication network,
 wherein said management computer comprises:
  a storage unit in which route information indicating a transfer route of frames in said communication network is stored; and
  a monitoring unit configured to refer to said route information to transmit a frame to said transfer route and to perform identification processing that identifies a location of a failure on said transfer route,
 wherein first to N-th nodes (N is an integer equal to or more than 3) line up in order along said transfer route,
 wherein an i-th node (i=1 to N−1) forwards a received frame to an (i+1)-th node, and the N-th node forwards a received frame to said management computer,
 wherein, in said identification processing, said monitoring unit sets at least one node between the first node and the N-th node as an insertion node, transmits a check frame to said insertion node, and identifies the location of the failure based on a reception state of a frame from the N-th node,
 wherein, in said identification processing, said monitoring unit initially sets the first node and the N-th node as a range start node and a range end node, respectively, and said monitoring unit sets an intermediate node between said range start node and said range end node as said insertion node,
 wherein, if said monitoring unit receives a frame from the N-th node, said monitoring unit newly sets said intermediate node as said range end node,
 wherein, if said monitoring unit fails to receive a frame from the N-th node, said monitoring unit newly sets said intermediate node as said range start node, and
 wherein, if there is no node between said range start node and said range end node, said monitoring unit determines that said failure is occurring between said range start node and said range end node.

2. The communication network management system according to claim 1,
 wherein said monitoring unit transmits a frame to the first node prior to said identification processing, and
 wherein, if said monitoring unit fails to receive a frame from the N-th node within a predetermined period of time after the transmission of the frame to the first node, said monitoring unit carries out said identification processing.

3. The communication network management system according to claim 1, wherein, in said identification processing, said monitoring unit changes said insertion node in turn from the (N−1)-th node towards the first node until said monitoring unit fails to receive a frame from the N-th node,
 wherein said insertion node when said monitoring unit fails to receive a frame from the N-th node is a k-th node, and wherein said monitoring unit determines that said failure is occurring between the k-th node and a (k+1)-th node.

4. The communication network management system according to claim 1, wherein, in said identification processing, said monitoring unit changes said insertion node in turn from the second node towards the N-th node until said monitoring unit receives a frame from the N-th node,
wherein said insertion node when said monitoring unit receives a frame from the N-th node is a k-th node, and
wherein said monitoring unit determines that said failure is occurring between a (k−1)-th node and the k-th node.

5. The communication network management system according to claim 1, wherein said range start node is an s-th node (s=1 to N−1),
wherein said range end node is an e-th node (e=2 to N; e>s),
wherein said intermediate node is an m-th node, and
wherein m is a maximum natural number not more than (s+e)/2.

6. The communication network management system according to claim 1, wherein each of said plurality of nodes comprises:
a table storage unit in which a forwarding table indicating a correspondence relationship between an input source and a forwarding destination of a frame is stored; and
a forwarding processing unit configured to forward a frame received from said input source to said forwarding destination by referring to said forwarding table,
wherein said management computer further comprises an entry control unit configured to instruct said each node to set up said forwarding table such that a frame is forwarded along said transfer route.

7. A communication network management system, comprising:
a communication network including a plurality of nodes and a plurality of links connecting between said plurality of nodes; and
a management computer configured to manage said communication network,
wherein said management computer comprises:
a storage unit in which route information indicating a transfer route of frames in said communication network is stored; and
a monitoring unit configured to refer to said route information to transmit a frame to said transfer route and to perform identification processing that identifies a location of a failure on said transfer route,
wherein first to N-th nodes (N is an integer equal to or more than 3) line up in order along said transfer route,
wherein an i-th node (i=1 to N−1) forwards a received frame to an (i+1)-th node, and the N-th node forwards a received frame to said management computer,
wherein, in said identification processing, said monitoring unit sets at least one node between the first node and the N-th node as an insertion node, transmits a check frame to said insertion node, and identifies the location of the failure based on a reception state of a frame from the N-th node,
wherein, in said identification processing, said monitoring unit initially sets the first node and the N-th node as a range start node and a range end node, respectively, and said monitoring unit sets n intermediate nodes (n is an integer equal to or more than 2) between said range start node and said range end node as said insertion node,
wherein said n intermediate nodes include:
a first intermediate node to which a first frame is transmitted from said monitoring unit; and
a second intermediate node to which a second frame is transmitted from said monitoring unit,
wherein, if said monitoring unit fails to receive the first frame from the N-th node, said monitoring unit newly sets said first intermediate node as said range start node,
wherein, if said monitoring unit receives the second frame from the N-th node, said monitoring unit newly sets said second intermediate node as said range end node, and
wherein, if there is no node between said range start node and said range end node, said monitoring unit determines that said failure is occurring between said range start node and said range end node.

8. The communication network management system according to claim 7, wherein said range start node is an s-th node (s=1 to N−1),
wherein said range end node is an e-th node (e=2 to N; e>s),
wherein said n intermediate nodes are m1-th to mn-th nodes, respectively, and
wherein mj (j=1 to n) is a maximum natural number not more than $((n+1-j) \times s + j \times e)/(n+1)$.

9. A management computer that manages a communication network including a plurality of nodes and a plurality of links connecting between said plurality of nodes, said management computer comprising:
a storage unit in which route information indicating a transfer route of frames in said communication network is stored; and
a monitoring unit configured to refer to said route information to transmit a frame to said transfer route and to perform identification processing that identifies a location of a failure on said transfer route,
wherein first to N-th nodes (N is an integer equal to or more than 3) line up in order along said transfer route,
wherein an i-th node (i=1 to N−1) forwards a received frame to an (i+1)-th node, and the N-th node forwards a received frame to said management computer,
wherein, in said identification processing, said monitoring unit sets at least one node between the first node and the N-th node as an insertion node, transmits a check frame to said insertion node, and identifies the location of the failure based on reception state of a frame from the N-th node,
wherein, in said identification processing, said monitoring unit initially sets the first node and the N-th node as a range start node and a range end node, respectively, and said monitoring unit sets an intermediate node between said range start node and said range end node as said insertion node,
wherein, if said monitoring unit receives a frame from the N-th node, said monitoring unit newly sets said intermediate node as said range end node,
wherein, if said monitoring unit fails to receive a frame from the N-th node, said monitoring unit newly sets said intermediate node as said range start node, and
wherein, if there is no node between said range start node and said range end node, said monitoring unit determines that said failure is occurring between said range start node and said range end node.

10. The management computer according to claim 9, wherein said monitoring unit transmits a frame to the first node prior to said identification processing, and
wherein, if said monitoring unit fails to receive a frame from the N-th node within a predetermined period of time after the transmission of the frame to the first node, said monitoring unit carries out said identification processing.

11. A communication network management method that manages a communication network by using a management computer,
- wherein said communication network includes a plurality of nodes and a plurality of links connecting between said plurality of nodes,
- wherein said communication network management method comprises:
  - transmitting a frame from said management computer to a transfer route of frames in said communication network, wherein first to N-th nodes (N is an integer equal to or more than 3) line up in order along said transfer route, an i-th node (i=1 to N−1) forwards a received frame to an (i+1)-th node, and the N-th node forwards a received frame to said management computer; and
  - identifying, by said management computer, a location of a failure on said transfer route,
- wherein said identifying comprises:
  - setting at least one node between the first node and the N-th node as an insertion node;
  - transmitting a check frame to said insertion node; and
  - identifying the location of the failure based on a reception state of a frame from the N-th node,
- wherein, in said identifying, the first node and the N-th node are initially set as a range start node and a range end node, respectively, and an intermediate node between said range start node and said range end node is set as said insertion node,
- wherein, if a frame from the N-th node is received, said intermediate node is newly set as said range end node,
- wherein, if a frame from the N-th node is failed to receive, said intermediate node is newly set as said range start node, and
- wherein, if there is no node between said range start node and said range end node, it is determined that said failure is occurring between said range start node and said range end node.

12. The communication network management method according to claim 11, further comprising:
- detecting, by said management computer, an occurrence of said failure on said transfer route, prior to said identifying,
- wherein said detecting comprises:
  - transmitting a frame to the first node; and
  - determining that said failure is occurring on said transfer route, if said management computer fails to receive a frame from the N-th node within a predetermined period of time after the transmission of the frame to the first node.

13. A non-transitory computer-readable storage medium that, when executed, causes a management computer to perform a management processing of a communication network,
- wherein said communication network includes a plurality of nodes and a plurality of links connecting between said plurality of nodes,
- wherein said management processing comprises:
  - storing route information indicating a transfer route of frames in said communication network in a storage device;
  - transmitting a frame to said transfer route by referring to said route information, wherein first to N-th nodes (N is an integer equal to or more than 3) line up in order along said transfer route, an i-th node (i=1 to N−1) forwards a received frame to an (i+1)-th node, and the N-th node forwards a received frame to said management computer; and
  - identifying a location of a failure on said transfer route,
- wherein said identifying comprises:
  - setting at least one node between the first node and the N-th node as an insertion node;
  - transmitting a check frame to said insertion node; and
  - identifying the location of the failure based on a reception state of a frame from the N-th node,
- wherein, in said identifying, the first node and the N-th node are initially set as a range start node and a range end node, respectively, and an intermediate node between said range start node and said range end node is set as said insertion node,
- wherein, if a frame from the N-th node is received, said intermediate node is newly set as said range end node,
- wherein, if a frame from the N-th node is failed to receive, said intermediate node is newly set as said range start node, and
- wherein, if there is no node between said range start node and said range end node, it is determined that said failure is occurring between said range start node and said range end node.

14. The non-transitory computer-readable storage medium according to claim 13, wherein said management processing further comprises:
- detecting an occurrence of said failure on said transfer route, prior to said identifying, and
- wherein said detecting comprises:
  - transmitting a frame to the first node; and
  - determining that said failure is occurring on said transfer route, if said management computer fails to receive a frame from the N-th node within a predetermined period of time after the transmission of the frame to the first node.

* * * * *